US007237229B2

(12) United States Patent
Ogawa et al.

(10) Patent No.: US 7,237,229 B2
(45) Date of Patent: Jun. 26, 2007

(54) DEBUGGING AID PARALLEL EXECUTION OF A PLURALITY OF ITERATIONS WITH SOURCE LISTS DISPLAY CORRESPONDING TO EACH ITERATION

(75) Inventors: Hajime Ogawa, Suita (JP); Kiyohiko Sumida, Yawata (JP); Shuichi Takayama, Takarazuka (JP); Katsuhiro Okuno, Higashiosaka (JP); Taketo Heishi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 585 days.

(21) Appl. No.: 10/287,231

(22) Filed: Nov. 4, 2002

(65) Prior Publication Data
US 2003/0093771 A1    May 15, 2003

(30) Foreign Application Priority Data
Nov. 5, 2001     (JP)     ............................. 2001-339954

(51) Int. Cl.
    G06F 9/44     (2006.01)
(52) U.S. Cl. .................. 717/125; 717/130; 717/131; 717/149; 712/241; 712/227; 714/35
(58) Field of Classification Search ................ 717/124, 717/129, 131, 149, 161, 151, 125; 712/241; 712/227; 714/34, 35; 709/102, 103, 104, 709/105, 106, 107, 108
See application file for complete search history.

(56) References Cited

U.S. PATENT DOCUMENTS 5,175,856 A * 12/1992 Van Dyke et al. .......... 717/151
5,179,702 A * 1/1993 Spix et al. .................. 718/102
5,241,635 A * 8/1993 Papadopoulos et al. ..... 712/201
5,262,976 A * 11/1993 Young et al. ............... 708/628
5,487,173 A * 1/1996 Greiss et al. ................ 712/35
5,539,911 A * 7/1996 Nguyen et al. .............. 712/23
5,560,032 A * 9/1996 Nguyen et al. .............. 712/23
5,588,152 A * 12/1996 Dapp et al. .................. 712/16
5,590,345 A * 12/1996 Barker et al. ................ 712/11
5,596,764 A * 1/1997 Intrater et al. .............. 712/34
5,625,836 A * 4/1997 Barker et al. ............... 709/214
5,689,720 A * 11/1997 Nguyen et al. .............. 712/23
5,742,783 A * 4/1998 Azmoodeh et al. ......... 712/212
5,790,825 A * 8/1998 Traut .......................... 712/209
5,796,624 A * 8/1998 Sridhar et al. ............... 703/14

(Continued)

OTHER PUBLICATIONS

TMS320C6x C Source Debugger User's Guide, Texas Instruments, Jan. 1998, Whole Manual.*

(Continued)

Primary Examiner—Todd Ingberg

(57) ABSTRACT

This invention makes debugging more efficient when an object program is intended for processing a loop made up of n groups of iteration-forming instructions. Instructions in the secondary assembler program each has a combination of a line number ";lx" and an iteration identifier ";ix" attached thereto. The line number ";lx" specifies a source code from which the instruction is generated, and the iteration identifier ";ix" specifies an iteration to which the instruction belongs. When the user sets a breakpoint at an instruction, displayed in the windows are (a) a source code for generating the instruction at the breakpoint and (b) another source code for generating another instruction that belongs to a different group of iteration-forming instructions than the breakpoint instruction.

30 Claims, 31 Drawing Sheets

U.S. PATENT DOCUMENTS

| | | | | |
|---|---|---|---|---|
| 5,946,493 | A * | 8/1999 | Hanson | 717/124 |
| 5,960,202 | A * | 9/1999 | Granston et al. | 717/141 |
| 5,966,538 | A * | 10/1999 | Granston et al. | 717/158 |
| 5,987,248 | A * | 11/1999 | Murayama et al. | 717/125 |
| 6,161,216 | A * | 12/2000 | Shagam | 717/128 |
| 6,412,106 | B1 * | 6/2002 | Leask et al. | 717/124 |
| 6,516,560 | B1 * | 2/2003 | Russell | 47/1.1 |
| 6,550,056 | B1 * | 4/2003 | Mizumoto et al. | 717/124 |
| 6,571,385 | B1 * | 5/2003 | Muthukumar et al. | 717/150 |
| 6,691,303 | B2 * | 2/2004 | Guthrie et al. | 717/124 |
| 6,701,516 | B1 * | 3/2004 | Li | 717/117 |
| 6,721,941 | B1 * | 4/2004 | Morshed et al. | 717/127 |
| 6,732,296 | B1 * | 5/2004 | Cherny et al. | 714/32 |
| 6,754,893 | B2 * | 6/2004 | Granston et al. | 717/161 |
| 6,760,903 | B1 * | 7/2004 | Morshed et al. | 717/130 |
| 6,795,963 | B1 * | 9/2004 | Andersen et al. | 717/130 |
| 6,799,266 | B1 * | 9/2004 | Stotzer et al. | 712/219 |
| 6,820,250 | B2 * | 11/2004 | Muthukumar et al. | 717/116 |
| 6,892,380 | B2 * | 5/2005 | Granston et al. | 717/160 |
| 6,912,709 | B2 * | 6/2005 | Helder et al. | 717/161 |
| 7,178,131 | B2 * | 2/2007 | Mitchell et al. | 717/124 |

OTHER PUBLICATIONS

TMS320C6x Optimizing C Compiler User's Guide, Preliminary, Texas Instruments, Jul. 1997, Whole Manual.*

TMS320C6000 -Law and A-Law Companding with Software or the McBSP, Mark A Castellano et al, Apr. 2000.*

How Debuggers Work Algorithms, Data Structures and Architecture, Jonathan B. Rosenberg, 1996, Whole Manual.*

* cited by examiner

FIG.2A

```
ℓ1: for (i=0;i<100;i++) {
ℓ2:   a = x[i];
ℓ3:   b = a + s;
ℓ4:   c = b * t;
ℓ5:   y[i] = c;
ℓ6: }
```

FIG.2B

```
;; ALLOCATION INFORMATION
;; x    r10
;; y    r11
;; a    r0
;; b    r1
;; c    r2
;; s    r5
;; t    r6 mov    x, r10        ;In
        mov    y, r11        ;In
loop:
```

| | | | |
|---|---|---|---|
| INSTRUCTION A | ld | (r10), r0 | ;I2 |
| INSTRUCTION B | add | r10, 4, r10 | ;In |
| | E | | |
| INSTRUCTION C | add | r0, r5, r1 | ;I3 |
| | E | | |
| INSTRUCTION D | mul | r1, r6, r2 | ;I4 |
| INSTRUCTION E | cmp | r10, x+400 | ;I1 |
| | E | | |
| INSTRUCTION F | st | r2, (r11) | ;I5 |
| INSTRUCTION G | add | r11, 4, r11 | ;In |
| INSTRUCTION H | blt | loop | ;In |
| | E | | |

FIG.5

Prolog:
```
;i1 A
ld   (r10),r0    add  r10,4,r10
                 ;i1 B
                              ;i1 C          ;i1 D              E
                              add  r0,r5,r1  mul  r1,r6,r2
                              ;i2 A
                              ld   (r10),r0  add  r10,4,r10     ;i2 B          ;i2 C
                                                                add  r0,r5,r1
``` kernel:
```
                                        ;s3 F            ;s3 G              H
                                        st   r2,(r11)    add  r11,4,r11  Sn: blt  loop
                                        ;s2 D                   ;s2 E
                                        mul  r1,r6,r2           cmp  r10,x+400
;s1 A                       ;s1 B                               ;s1 C
ld   (r10),r0    add  r10,4,r10                                 add  r0,r5,r1
``` epilog:
```
;i2 F            ;i2 G              H
st   r2,(r11)    add  r11,4,r11
;i3 D                   E           ;i3 F            ;i3 G
mul  r1,r6,r2                       st   r2,(r11)    add  r11,4,r11
```

FIG.6A  GROUPS OF INSTRUCTIONS THAT BELONG TO DIFFERENT ITERATIONS AND CAN BE EXECUTED IN PARALLEL
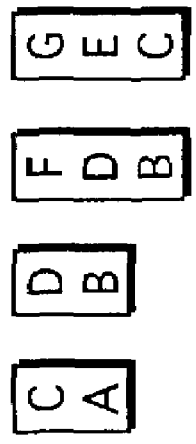
FIG.6B  GROUPS OF INSTRUCTIONS THAT BELONG TO SAME ITERATIONS AND CAN BE EXECUTED IN PARALLEL

FIG.8

```
                    mov   x, r10        ;l1
                    mov   y, r10        ;l1
                    E
;; prolog
  INSTRUCTION   A   ld    (r10), r0     ;l2 ;i1 ⎤
  INSTRUCTION   B   add   r10, 4, r10   ;ln ;i1 ⎦ PARALLEL EXECUTION BLOCK #1
                    E
  INSTRUCTION   C   add   r0, r5, r1    ;l3 ;i1 ⎤
  INSTRUCTION   A   ld    (r10), r0     ;l2 ;i2 ⎬ PARALLEL EXECUTION BLOCK #2
  INSTRUCTION   B   add   r10, 4, r10   ;ln ;i2 ⎦
                    E
  INSTRUCTION   D   mul   r1, r6, r2    ;l4 ;i1 ⎤ PARALLEL EXECUTION BLOCK #3
  INSTRUCTION   C   add   r0, r5, r1    ;l3 ;i2 ⎦
                    E
                    E
;; kernel
loop:
  INSTRUCTION   A   ld    (r10), r0        ;l2 ;s1 ⎤
  INSTRUCTION   B   add   r10, 4, r10      ;ln ;s1 ⎥ PARALLEL EXECUTION BLOCK #4
  INSTRUCTION   D   mul   r1, r6, r2       ;l4 ;s2 ⎥
  INSTRUCTION   E   cmp   r10, x+400       ;l1 ;s2 ⎦
                    E
  INSTRUCTION   C   add   r0, r5, r1       ;l3 ;s1 ⎤
  INSTRUCTION   F   st    r2, (r11)        ;l5 ;s3 ⎥ PARALLEL EXECUTION BLOCK #5
  INSTRUCTION   G   add   r11, r4, r11     ;ln ;s3 ⎥
  INSTRUCTION   H   blt   loop             ;ln ;sn ⎦
                    E
;; epilog
  INSTRUCTION   D   mul   r1, r6, r2       ;l4 ;i3 } PARALLEL EXECUTION BLOCK #6
                    E
  INSTRUCTION   F   st    r2, (r11)        ;l5 ;i2 ⎤ PARALLEL EXECUTION BLOCK #7
  INSTRUCTION   G   add   r11, r4, r11     ;l4 ;i2 ⎦
                    E
                    E
  INSTRUCTION   F   st    r2, (r11)        ;l5 ;i3 ⎤ PARALLEL EXECUTION BLOCK #8
  INSTRUCTION   G   add   r11, r4, r11     ;l5 ;i3 ⎦
                    E
```

FIG.12
Prolog:
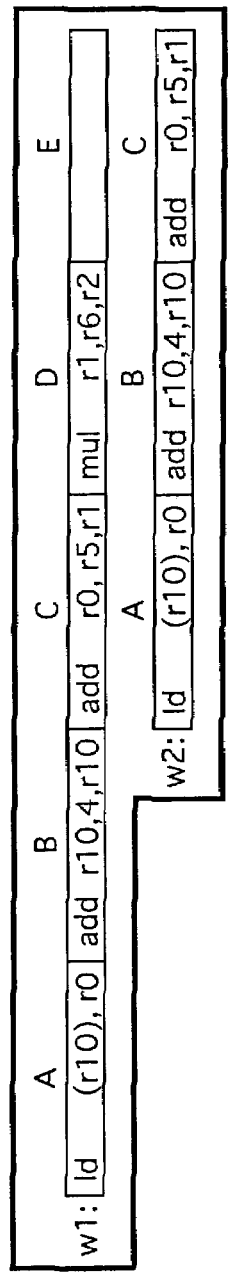
kernel:
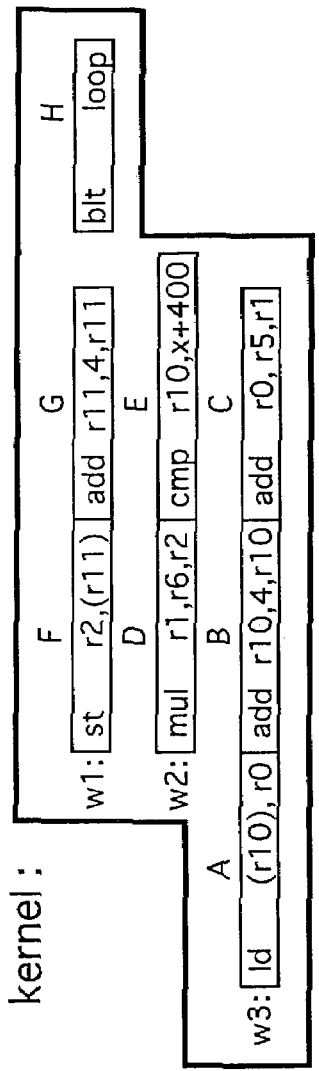
epilog:
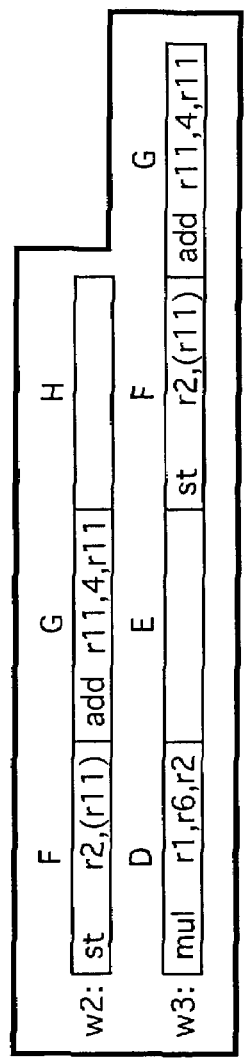

FIG.13

```
0040              mov    x, r10       ; I1
0041              mov    y, r10       ; I1
                  E
   ;; prolog
0042  INSTRUCTION  A  ld    (r10), r0    ; In w1; In w2; I2 w3
0043  INSTRUCTION  B  add   r10, 4, r10  ; In w1; In w2; In w3
                  E
0044  INSTRUCTION  C  add   r0, r5, r1   ; In w1; In w2; I3 w3
0045  INSTRUCTION  A  ld    (r10), r0    ; In w1; I2 w2; In w3
0046  INSTRUCTION  B  add   r10, 4, r10  ; In w1; In w2; In w3
                  E
0047  INSTRUCTION  D  mul   r1, r6, r2   ; In w1; In w2; I4 w3
0048  INSTRUCTION  C  add   r0, r5, r1   ; In w1; I3 w2; In w3
                  E
                  E
   ;; kernel
   loop:
0049  INSTRUCTION  A  ld    (r10), r0    ; I2 w1; In w2; In w3
0050  INSTRUCTION  B  add   r10, 4, r10  ; In w1; In w2; In w3
0051  INSTRUCTION  D  mul   r1, r6, r2   ; In w1; I4 w2; In w3
0052  INSTRUCTION  E  cmp   r10, x+388   ; In w1; I1 w2; In w3
                  E
0053  INSTRUCTION  C  add   r0, r5, r1   ; I3 w1; In w2; In w3
0054  INSTRUCTION  F  st    r2, (r11)    ; In w1; In w2; I5 w3
0055  INSTRUCTION  G  add   r11, r4, r11 ; In w1; In w2; In w3
0056  INSTRUCTION  H  blt   loop         ; In w1; In w2; In w3
                  E
   ;; epilog
0057  INSTRUCTION  D  mul   r1, r6, r2   ; I4 w1; In w2; In w3
                  E
0058  INSTRUCTION  F  st    r2, (r11)    ; In w1; I5 w2; In w3
0059  INSTRUCTION  G  add   r11, r4, r11 ; In w1; I4 w2; In w3
                  E
                  E
0060  INSTRUCTION  F  st    r2, (r11)    ; I5 w1; In w2; In w3
0061  INSTRUCTION  G  add   r11, r4, r11 ; I5 w1; In w2; In w3
                  E
```

FIG.14A

IN CASE INSTRUCTION j IS SPECIFIED FROM THE SAME PARALLEL
EXECUTION BLOCK AS INSTRUCTION i

```
0040             mov    x, r10        ; l1
0041             mov    y, r10        ; l1
                 E
      ;; prolog
0042 INSTRUCTION A   ld     (r10), r0     ; In w1; In w2; l2 w3
0043 INSTRUCTION B   add    r10, 4, r10   ; In w1; In w2; In w3
                 E
0044 INSTRUCTION C   add    r0, r5, r1    ; In w1; In w2; l3 w3
0045 INSTRUCTION A   ld     (r10), r0     ; In w1; l2 w2; In w3
0046 INSTRUCTION B   add    r10, 4, r10   ; In w1; In w2; In w3
                 E
0047 INSTRUCTION D   mul    r1, r6, r2    ; In w1; In w2; l4 w3
0048 INSTRUCTION C   add    r0, r5, r1    ; In w1; l3 w2; In w3
                 E
                 E   INSTRUCTION j   LINE NUMBER ly
      ;; kernel                /              
      loop:                   jy1
0049 INSTRUCTION A   ld     (r10), r0     ; l2 w1; In w2; In w3
0050 INSTRUCTION B   add    r10, 4, r10   ; In w1; In w2; In w3
0051 INSTRUCTION D   mul    r1, r6, r2    ; In w1; l4 w2; In w3   jy2
0052 INSTRUCTION E   cmp    r10, x+388    ; In w1; l1 w2; In w3
                 E       INSTRUCTION j        LINE NUMBER ly
0053 INSTRUCTION C   add    r0, r5, r1    ; l3 w1; In w2; In w3
0054 INSTRUCTION F   st     r2, (r11)     ; In w1; In w2; l5 w3
0055 INSTRUCTION G   add    r11, r4, r11  ; In w1; In w2; In w3
0056 INSTRUCTION H   blt    loop          ; In w1; In w2; In w3
                 E
      ;; epilog
0057 INSTRUCTION D   mul    r1, r6, r2    ; l4 w1; In w2; In w3
                 E
0058 INSTRUCTION F   st     r2, (r11)     ; In w1; l5 w2; In w3
0059 INSTRUCTION G   add    r11, r4, r11  ; In w1; l4 w2; In w3
                 E
                 E
0060 INSTRUCTION F   st     r2, (r11)     ; l5 w1; In w2; In w3
0061 INSTRUCTION G   add    r11, r4, r11  ; l5 w1; In w2; In w3
                 E
```

INSTRUCTION i points to lines 0050.

FIG.14B

IN CASE INSTRUCTION j IS SPECIFIED FROM THE SAME PARALLEL
EXECUTION BLOCK AS INSTRUCTION i

```
0040            mov    x, r10         ; I1
0041            mov    y, r10         ; I1
                E
 ;; prolog
0042 INSTRUCTION A  ld    (r10), r0      ; In w1; In w2; I2 w3
0043 INSTRUCTION B  add   r10, 4, r10    ; In w1; In w2; I2 w3
                E
0044 INSTRUCTION C  add   r0, r5, r1     ; In w1; In w2; I3 w3
0045 INSTRUCTION A  ld    (r10), r0      ; In w1; I2 w2; I3 w3
0046 INSTRUCTION B  add   r10, 4, r10    ; In w1; I2 w2; I3 w3
                E
0047 INSTRUCTION D  mul   r1, r6, r2     ; In w1; I3 w2; I4 w3
0048 INSTRUCTION C  add   r0, r5, r1     ; In w1; I3 w2; I4 w3
                E
                E
 ;; kernel
 loop:
0049 INSTRUCTION A  ld    (r10), r0      ; I2 w1; In w2; In w3
0050 INSTRUCTION B  add   r10, 4, r10    ; I2 w1; In w2; In w3
0051 INSTRUCTION D  mul   r1, r6, r2     ; I2 w1; I4 w2; In w3
0052 INSTRUCTION E  cmp   r10, x+388     ; I2 w1; I1 w2; In w3
                E
0053 INSTRUCTION C  add   r0, r5, r1     ; I3 w1; In w2; I5 w3
0054 INSTRUCTION F  st    r2, (r11)      ; I3 w1; In w2; I5 w3
0055 INSTRUCTION G  add   r11, r4, r11   ; I3 w1; In w2; I5 w3
0056 INSTRUCTION H  blt   loop           ; I3 w1; In w2; I5 w3
                E
 ;; epilog
0057 INSTRUCTION D  mul   r1, r6, r2     ; I4 w1; I5 w2; In w3
                E
0058 INSTRUCTION F  st    r2, (r11)      ; I4 w1; I5 w2; In w3
0059 INSTRUCTION G  add   r11, r4, r11   ; I4 w1; I4 w2; In w3
                E
                E
0060 INSTRUCTION F  st    r2, (r11)      ; I5 w1; In w2; In w3
0061 INSTRUCTION G  add   r11, r4, r11   ; I5 w1; In w2; In w3
                E
```

FIG.15A

IN CASE AN INSTRUCTION WHICH PRECEDES INSTRUCTION i IS
DETECTED AS INSTRUCTION j

```
0040            mov    x, r10        ; I1
0041            mov    y, r10        ; I1          INSTRUCTION i
              E
   ;; prolog
 0042  INSTRUCTION A   ld    (r10), r0    ; In w1; In w2; I2 w3
 0043  INSTRUCTION B   add   r10, 4, r10  ; In w1; In w2; In w3
              E
 0044  INSTRUCTION C   add   r0, r5, r1   ; In w1; In w2; I3 w3
 0045  INSTRUCTION A   ld    (r10), r0    ; In w1; I2 w2; In w3
 0046  INSTRUCTION B   add   r10, 4, r10  ; In w1; In w2; In w3
              E
 0047  INSTRUCTION D   mul   r1, r6, r2   ; In w1; In w2; I4 w3
 0048  INSTRUCTION C   add   r0, r5, r1   ; In w1; I3 w2; In w3
              E
              E  INSTRUCTION j    LINE NUMBER ly
   ;; kernel                    jy1       jy2   LINE NUMBER ly
   loop:
 0049  INSTRUCTION A   ld    (r10), r0    ; I2 w1; In w2; In w3
 0050  INSTRUCTION B   add   r10, 4, r10  ; In w1; In w2; In w3
 0051  INSTRUCTION D   mul   r1, r6, r2   ; In w1; I4 w2; In w3
 0052  INSTRUCTION E   cmp   r10, x+388   ; In w1; I1 w2; In w3
              E  INSTRUCTION j
 0053  INSTRUCTION C   add   r0, r5, r1   ; I3 w1; In w2; In w3
 0054  INSTRUCTION F   st    r2, (r11)    ; In w1; In w2; I5 w3
 0055  INSTRUCTION G   add   r11, r4, r11 ; In w1; In w2; In w3
 0056  INSTRUCTION H   blt   loop         ; In w1; In w2; In w3
              E
   ;; epilog
 0057  INSTRUCTION D   mul   r1, r6, r2   ; I4 w1; In w2; In w3
              E
 0058  INSTRUCTION F   st    r2, (r11)    ; In w1; I5 w2; In w3
 0059  INSTRUCTION G   add   r11, r4, r11 ; In w1; I4 w2; In w3
              E
              E
 0060  INSTRUCTION F   st    r2, (r11)    ; I5 w1; In w2; In w3
 0061  INSTRUCTION G   add   r11, r4, r11 ; I5 w1; In w2; In w3
              E
```

FIG.15B

IN CASE AN INSTRUCTION WHICH PRECEDES INSTRUCTION i IS
DETECTED AS INSTRUCTION j

```
0040                mov    x, r10       ; I1
0041                mov    y, r10       ; I1
                    E
    ;; prolog
0042 INSTRUCTION A  ld     (r10), r0    ; I2 w1; I2 w2; |I2 w3|
0043 INSTRUCTION B  add    r10, 4, r10  ; I2 w1; I2 w2; I3 w3
                    E
0044 INSTRUCTION C  add    r0, r5, r1   ; I2 w1; I2 w2; |I3 w3|
0045 INSTRUCTION A  ld     (r10), r0    ; I2 w1; |I2 w2|; I4 w3
0046 INSTRUCTION B  add    r10, 4, r10  ; I2 w1; I3 w2; I4 w3
                    E
0047 INSTRUCTION D  mul    r1, r6, r2   ; I2 w1; I3 w2; |I4 w3|
0048 INSTRUCTION C  add    r0, r5, r1   ; I2 w1; |I3 w2|; I5 w3
                    E
                    E
    ;; kernel
    loop:
0049 INSTRUCTION A  ld     (r10), r0    ; |I2 w1|; I4 w2; I5 w3
0050 INSTRUCTION B  add    r10, 4, r10  ; I3 w1; I4 w2; I5 w3
0051 INSTRUCTION D  mul    r1, r6, r2   ; I3 w1; |I4 w2|; I5 w3
0052 INSTRUCTION E  cmp    r10, x+388   ; I3 w1; |I1 w2|; I5 w3
                    E
0053 INSTRUCTION C  add    r0, r5, r1   ; |I3 w1|; I5 w2; I5 w3
0054 INSTRUCTION F  st     r2, (r11)    ; I4 w1; I5 w2; |I5 w3|
0055 INSTRUCTION G  add    r11, r4, r11 ; I4 w1; I5 w2; In w3
0056 INSTRUCTION H  blt    loop         ; I4 w1; I5 w2; In w3
                    E
    ;; epilog
0057 INSTRUCTION D  mul    r1, r6, r2   ; |I4 w1|; I5 w2; In w3
                    E
0058 INSTRUCTION F  st     r2, (r11)    ; I5 w1; |I5 w2|; In w3
0059 INSTRUCTION G  add    r11, r4, r11 ; I5 w1; |I4 w2|; In w3
                    E
                    E
0060 INSTRUCTION F  st     r2, (r11)    ; |I5 w1|; In w2; In w3
0061 INSTRUCTION G  add    r11, r4, r11 ; |I5 w1|; In w2; In w3
                    E
```

FIG.17

| ALLOCATION INFORMATION | LIVING PERIOD INFORMATION |
|---|---|
| x r10 | 0041- |
| y r11 | 0042- |
| a r0 | 0043-0045, w3 |
|  | 0046-0049, w2 |
|  | 0050-0056, w1, 0049, w2 |
|  | 0057-, w1 |
| b r1 | 0045-0048, w3 |
|  | 0049-0053, w2 |
|  | 0054-0056, w1, 0049-0053, w2 |
|  | 0057-, w1 |

FIG.24
ASSEMBLER ONE-STEP

```
ASSEMBLER WINDOW 0040              mov   x, r10
0041              mov   y, r10
            ;; prolog
0042 INSTRUCTION A    ld    (r10), r0
0043 INSTRUCTION B    add   r10, 4, r10
                      E
0044 INSTRUCTION C    add   r0, r5, r1
0045 INSTRUCTION A    ld    (r10), r0
0046 INSTRUCTION B    add   r10, 4, r10
                      E
0047 INSTRUCTION D    mul   r1, r6, r2
0048 INSTRUCTION C    add   r0, r5, r1
                      E
                      E
            ;; kernel
            loop:
0049 INSTRUCTION A    ld    (r10), r0
0050 INSTRUCTION B    add   r10, 4, r10
0051 INSTRUCTION D    mul   r1, r6, r2
0052 INSTRUCTION E    cmp   r10, x+388
                      E
0053 INSTRUCTION C    add   r0, r5, r1
0054 INSTRUCTION F    st    r2, (r11)
0055 INSTRUCTION G    add   r11, r4, r11
0056 INSTRUCTION H    blt   loop
                      E
            ;; epilog
0057 INSTRUCTION D    mul   r1, r6, r2
                      E
0058 INSTRUCTION F    st    r2, (r11)
0059 INSTRUCTION G    add   r11, r4, r11
``` cy1 → CURRENT ADDRESS / ASSEMBLER ONE-STEP EXECUTION (at 0049, 0050)
cy2 → (at 0054)
ry3 → SOURCE ONE-STEP EXECUTION

SOURCE WINDOW #i
```
ℓ1 for (i = 0; i < 100; i++) {
ℓ2      a = x[i];
ℓ3      b = a + s;
ℓ4      c = b * t;
ℓ5      y[i] = c;
ℓ6 }
```

SOURCE WINDOW #i+1
```
ℓ1 for (i = 0; i < 100; i++) {
ℓ2      a = x[i];
ℓ3      b = a + s;
ℓ4      c = b * t;
ℓ5      y[i] = c;
ℓ6 }
```
ry1 → CURRENT LINE / SOURCE ONE-STEP EXECUTION
ry2

SOURCE WINDOW #i+2
```
ℓ1 for (i = 0; i < 100; i++) {
ℓ2      a = x[i];
ℓ3      b = a + s;
ℓ4      c = b * t;
ℓ5      y[i] = c;
ℓ6 }
```

FIG. 25

SOURCE CODE ONE-STEP

ASSEMBLER WINDOW

```
0040              mov   x, r10
0041              mov   y, r10
       ;; prolog
0042  INSTRUCTION A   ld    (r10), r0
0043  INSTRUCTION B   add   r10, 4, r10
                     E
0044  INSTRUCTION C   add   r0, r5, r1
0045  INSTRUCTION A   ld    (r10), r0
0046  INSTRUCTION B   add   r10, 4, r10
                     E
0047  INSTRUCTION D   mul   r1, r6, r2
0048  INSTRUCTION C   add   r0, r5, r1
                     E
                     E
       ;; kernel
       loop:
0049  INSTRUCTION A   ld    (r10), r0
0050  INSTRUCTION B   add   r10, 4, r10
0051  INSTRUCTION D   mul   r1, r6, r2
0052  INSTRUCTION E   cmp   r10, x+388
                     E
0053  INSTRUCTION C   add   r0, r5, r1
0054  INSTRUCTION F   st    r2, (r11)
0055  INSTRUCTION G   add   r11, r4, r11
0056  INSTRUCTION H   blt   loop
       ;; epilog
0057  INSTRUCTION D   mul   r1, r6, r2
                     E
0058  INSTRUCTION F   st    r2, (r11)
0059  INSTRUCTION G   add   r11, r4, r11
```

↑ SOURCE ONE-STEP EXECUTION ry3

SOURCE WINDOW # i
```
ℓ1 for (i = 0; i < 100; i++) {
ℓ2     a = x[i];
ℓ3     b = a + s;
ℓ4     c = b * t;
ℓ5     y[i] = c;
ℓ6 }
```

SOURCE WINDOW # i+1
```
ℓ1 for (i = 0; i < 100; i++) {
ℓ2     a = x[i];
ℓ3     b = a + s;
ℓ4     c = b * t;
ℓ5     y[i] = c;
ℓ6 }
```
↑ SOURCE ONE-STEP EXECUTION ry2

SOURCE WINDOW # i+2
```
ℓ1 for (i = 0; i < 100; i++) {
ℓ2     a = x[i];
ℓ3     b = a + s;
ℓ4     c = b * t;
ℓ5     y[i] = c;
ℓ6 }
```

FIG.28

```
0040            mov x, r10
0041            mov y, r10
                E
;; prolog
0042  INSTRUCTION A    ld   (r10), r0
0043  INSTRUCTION B    add  r10, 4, r10
                       E
0044  ISTRUCTION  C    add  r0, r5, r1
0045  INSTRUCTION A    ld   (r10), r0
0046  INSTRUCTION B    add  r10, 4, r10
                       E
0047  INSTRUCTION D    mul  r1, r6, r2
0048  INSTRUCTION C    add  r0, r5, r1
                       E
                       E
;; kernel
loop:
0049  INSTRUCTION A    ld   (r10), r0
0050  INSTRUCTION B    add  r10, 4, r10
0051  INSTRUCTION D    mul  r1, r6, r2
0052  INSTRUCTION E    cmp  r10, x+388
                       E
0053  INSTRUCTION C    add  r0, r5, r1
0054  INSTRUCTION F    st   r2, (r11)
0055  INSTRUCTION G    add  r11, r4, r11
0056  INSTRUCTION H    blt  loop
                       E
;; epilog
0057  INSTRUCTION D    mul  r1, r6, r2
                       E
0058  INSTRUCTION F    st   r2, (r11)
0059  INSTRUCTION G    add  r11, r4, r11
```

SOURCE WINDOW

```
ℓ1 for (i=0;i<100;i++) {
ℓ2     a = x[i];
ℓ3     b = a+s;
ℓ4     c = b*t;
ℓ5     y[i] = c;
ℓ6 }
```

FIG.29

SOURCE WINDOW
```
ℓ1 for (i=0; i<100; i++) {
ℓ2    a = x[i];
ℓ3    b = a + s;
ℓ4    c = b * t;
ℓ5    y[i] = c;
ℓ6 }
```

```
0040              mov x, r10
0041              mov y, r10
                  E
        ;; prolog
0042 INSTRUCTION A    ld   (r10), r0
0043 INSTRUCTION B    add  r10, 4, r10
                      E
0044 ISTRUCTION C     add  r0, r5, r1
0045 INSTRUCTION A    ld   (r10), r0
0046 INSTRUCTION B    add  r10, 4, r10
                      E
0047 INSTRUCTION D    mul  r1, r6, r2
0048 INSTRUCTION C    add  r0, r5, r1
                      E
        ;; kernel
        loop:
0049 INSTRUCTION A    ld   (r10), r0
0050 INSTRUCTION B    add  r10, 4, r10
0051 INSTRUCTION D    mul  r1, r6, r2
0052 INSTRUCTION E    cmp  r10, x+388
                      E
0053 INSTRUCTION C    add  r0, r5, r1
0054 INSTRUCTION F    st   r2, (r11)
0055 INSTRUCTION G    add  r11, r4, r11
0056 INSTRUCTION H    blt  loop
                      E
        ;; epilog
0057 INSTRUCTION D    mul  r1, r6, r2
                      E
0058 INSTRUCTION F    st   r2, (r11)
0059 INSTRUCTION G    add  r11, r4, r11
```

DEBUGGING AID PARALLEL EXECUTION OF A PLURALITY OF ITERATIONS WITH SOURCE LISTS DISPLAY CORRESPONDING TO EACH ITERATION

BACKGROUND OF THE INVENTION (1) Field of the Invention

The present-invention relates to a debugging aid device and a compiling device that provide aid in debugging object programs into which source programs have been translated.

(2) Description of the Related Art

It has been long since there were demands for improvement of computer program quality, along with the development of advanced information technology. In the fields of program development, people have been constantly seeking for ways to make programmers' debugging process more efficient through trial and error.

An object program, which is the final product, is generated with use of a compiler that translates a source program written in a high-level programming language. Debugging is to run an object program on an exploratory basis, so as to correct the source program if there is any problem, and make a new object program from the corrected source program. A debugging aid device makes debugging more efficient with such functions as "breakpoint setting" to set a breakpoint at an arbitrary point of an object program so that the program halts at that point; "one-step execution" to execute one instruction at a time after the halt; and "resource reference" to indicate, in the halting state, the value held by the hardware resource. In addition, there is a function to indicate a source code that corresponds to the instruction at which a breakpoint is set, and this function helps correction process of the source program in case bugs are found.

Recent program development often experiences a situation where debugging is necessary for an object program optimized for parallel processing. Examples of methods of optimizing an object program for parallel processing are Loop Unrolling and Software Pipelining. Especially, an object program with the latter, Software Pipelining, includes repeating units (called iterations) of a loop each made up of instructions, so that instructions that belong to different iterations can be executed in pipelining parallelism. In order to debug an object program with software pipelining, programmers focus on finding out which instructions are to be executed in parallel, and which lines of a source code those instructions correspond to; however, execution of an object program with software pipelining involves special processing i.e. an iteration is executed with a little delay from its previous iteration, instead of instructions in different iterations being executed completely in parallel; therefore, it is difficult to express this special processing with source codes.

On the other hand, if no source codes were indicated to show corresponding instructions to be executed in parallel, it would make burdens for programmers. A programmer is required to thoroughly understand the correspondence between the source codes he or she writes and instructions in an object program, as well as to debug the program imagining how the program will be processed when being executed in pipeline. This presents a problem that debugging procedure makes slower progress than expected.

SUMMARY OF THE INVENTION

An object of the present invention is to provide a debugging aid device that is able to describe the way a plurality of iterations are executed in parallel.

The object of the present invention can be achieved by a debugging aid device that provides aid in debugging when a plurality of iterations are executed in parallel, each being made up of a succession of instructions which are obtained by a compiler translating a plurality of source codes, the debugging aid device comprising: a list displaying unit operable to display the plurality of source lists in correspondence with each of the plurality of iterations; a specifying unit operable to specify, according to an input from a user, a source code within a first source list as a starting or an ending location of the execution; and a code displaying unit operable to display which source code within a second source list corresponds to the starting or the ending location of the execution.

When the user using a code specifying unit, specifies a source code instruction in a source list, displayed on a list displaying unit, a code display unit will display which source code instruction in another source list corresponds to the specified soiree code instruction. This will allow a programmer, when a plurity of iterations executed in parallel, to understand which source code instructions will be executed simultaneously. Further, the programmer will not be confused even when a loop is processed with a pipelining parallelism. This way, the programmer will be able to find out quickly the cause of a malfunction, if there is any in the loop.

Here, the debugging aid device may further comprise a variable displaying unit operable to display, for each of the source lists, a value of each of variables used in the source lists, wherein the value of each of the variables is determined either at the starting or the ending location of each of the source lists. This device allows the user to observe how the variable gets updated at every source code in the source program, when the variable is being debugged.

Here, it would be desirable to have a compiling device that translates a source program, so as to generate the object program and the debug list, the compiling device comprising: a translating unit operable to translate a plurality of source codes that form a loop body in the source program into a succession of instructions; a copying unit operable to copy the succession of instructions so as to have a plurality of iterations each being made up of the succession of the instructions; a grouping unit operable to group up such instructions that belong to the successions of the instructions and are to be executed simultaneously into each of a plurality of parallel execution blocks separated by a boundary code; and a creating unit operable to create the debug list by attaching a combination of an identifier and a line number to each of the instructions in the parallel execution blocks, the identifier uniquely identifying one particular iteration among the plurality of iterations, and the line number identifying one of the source codes for the particular iteration.

This compiling device allows a debugging aid device to work with a full scope of its ability because the compiling device generates an object program fitted to processing of a loop as well as a debug list in which identifiers and line numbers are added to the object program.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2A is an example of a source program;

FIG. 2B is an example of a primary assembler program;

FIG. 5 is a pipeline image after iteration identifiers and stage identifiers are attached through the processing steps;

FIG. 6A and FIG. 6B show groups of instructions that can be executed in parallel;

FIG. 8 is a secondary assembler program as a result of Step S8;

FIG. 12 shows examples of assignment of window identifiers to iterations;

FIG. 13 is a secondary assembler program as a result of attaching window identifiers and line numbers to the program of FIG. 8;

FIG. 14A is a program after the processing of Steps S20 and S21;

FIG. 14B is an example of a secondary assembler program with window identifiers attached;

FIG. 15A is a program after the processing of Steps S20 and S21;

FIG. 15B is an example of a secondary assembler program with window identifiers attached;

FIG. 17 shows examples of allocation information and living period information;

FIG. 24 shows an example of one-step execution in the assembler window;

FIG. 25 shows an example of one-step execution in the source window;

FIG. 28 shows an example of displays in the modification B-1; and

FIG. 29 shows an example of displays in the modification B-2.

DESCRIPTION OF THE PREFERRED EMBODIMENT

Figure 1:
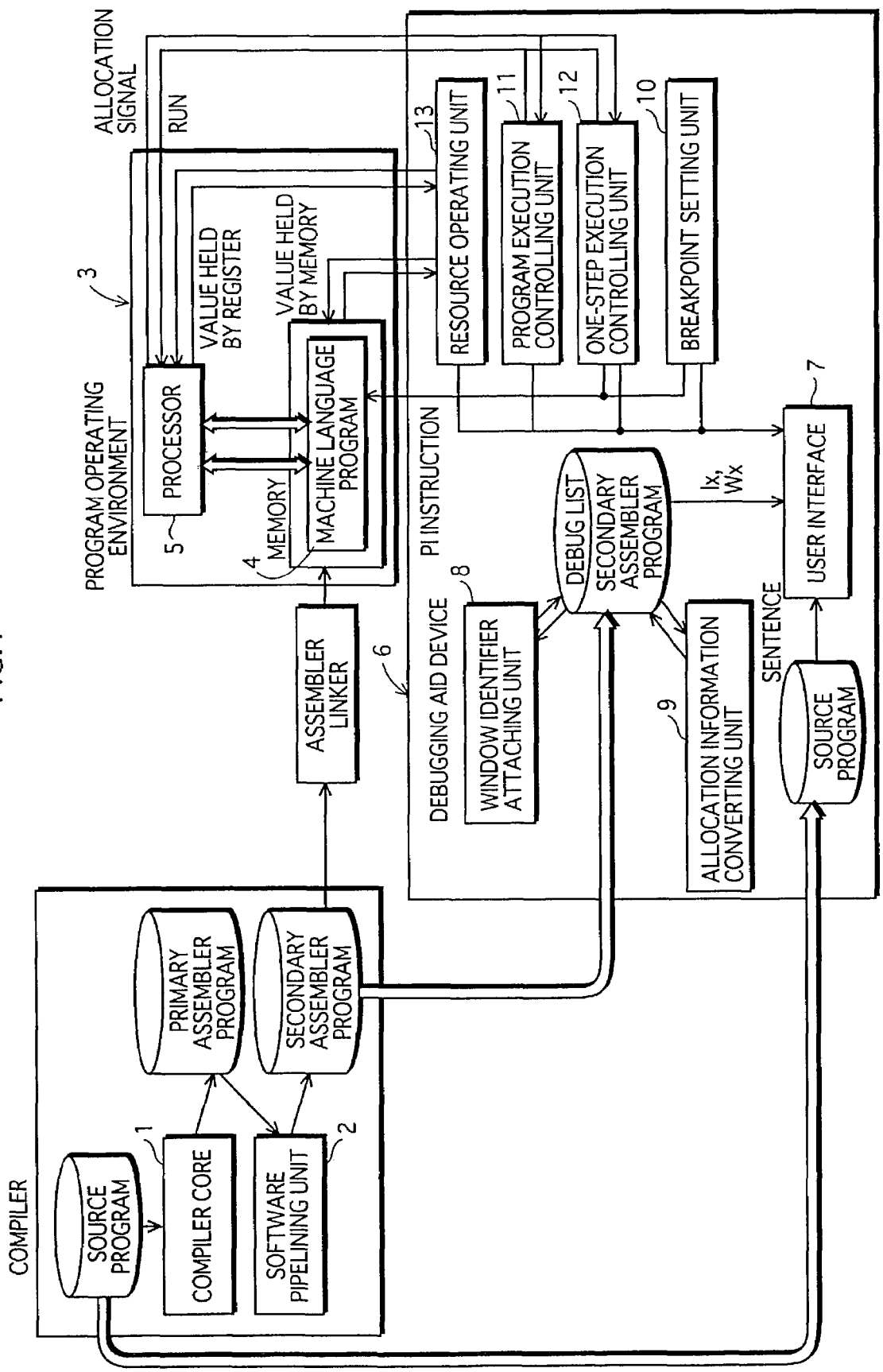
FIG. 1 shows the internal structure of a program development system.

The following describes a compiling device and a debugging aid device according to a preferred embodiment of the present invention, with reference to the drawings. The compiling device and the debugging aid device of the present invention are part of the program development system shown in FIG. 1. As shown in FIG. 1, the program development system comprises: a compiling device (including a compiler core 1 and a software pipelining unit 2), a program operating environment 3 (including a memory 4 and a processor 5), and a debugging aid device 6 (including a user interface 7, a window identifier attaching unit 8, an allocation information converting unit 9, a breakpoint setting unit 10, a program execution controlling unit 11, a one-step execution controlling unit 12, and a resource operating unit 13).

Compiler Core 1

The compiler core 1 is a core of the compiling device and translates a source program written in a high-level programming language into a primary assembler program. The translation process by the compiler core 1 includes syntax analysis, unnecessary-code deletion, constant convolution, induction variable optimization, and resource allocation to variables. FIG. 2A is an example of a source program, and FIG. 2B is an example of a primary assembler program. A source program describes loop algorithms with sentences written in a high-level programming language. The loop in this case has variable i as an induction variable and proceeds as follows: x [i], which is the i'th element of array x, is assigned to variable a (line 2); variable s plus variable a are assigned to variable b (line 3); variable b multiplied by variable t is stored in variable c (line 4); and variable c is stored in y [i], which is the i'th element of array y (line 5). On the other hand, the primary assembler program describes the same loop algorithms as in the source program with assembler instructions. These assembler instructions are used to operate registers r0 through r11 included in the processor of the target machine.

In the primary assembler program, x and y, which are the entry addresses of the array x [i] and the array y [i] respectively, will be stored in the registers r10 and r11 respectively, and will be incremented by four at Instruction B "add r10, 4, r10" and Instruction G "add r11, 4, r11" respectively every time the loop is processed. In the primary assembler program, the register r10 plays a role as an induction variable i. The terminating condition for the loop is that the value of the register r10 at Instruction E "cmp r10, x+400" is judged to be "x+400". The variables a, b, c, s, and t correspond to the registers r0, r1, r2, r5, and r6 respectively. Read-out of the array element x[i] in line 2 corresponds to Instruction A "ld (r10), r0". Writing of the array element y [i] in line 5 corresponds to Instruction F "st r2, r(11)". Further, addition and multiplication in line 3 and line 4 correspond to Instruction C "add r0, r5, r1" and Instruction D "mul r1, r6, r2" respectively. Here, it needs to be emphasized that the primary assembler program is optimized for high-speed processing of the loop, and that allocation information and line numbers are attached as debugging information to be used at times of debugging. The boundary E in FIG. 2B is an end code to separate a group of one or more instructions that can be executed in parallel from another group. According to this, Instruction A "ld (r10), r0" and Instruction B "add r10, 4, r10" make the first parallel execution block; Instruction C "add r0, r5, r1" makes the second parallel execution block; Instruction D "mul r1, r6, r2" and Instruction E "cmp r10, x+400" make the third parallel execution block; Instruction F "st r2, r(11)", Instruction G "add r11, 4, r11", and Instruction H "blt loop" make the fourth parallel execution block. The characters such as ;11, ;12, ;13, ;14 attached at the end of the instructions each uniquely indicates a line number of the sentence to which the instruction corresponds. For example, ";12" attached to Instruction A "ld (r10), r0" denotes that the instruction corresponds to the second sentence of the source program. ";13" attached to Instruction C "add r0, r5, r1" denotes that the instruction corresponds to the third sentence of the source program. ";ln" attached to Instruction B "add r10, 4, r10" denotes that there is no sentence that uniquely corresponds to the Instruction B "add r10, 4, r10". In this description of the invention, such sentences of the source program that can be uniquely specified by the line numbers are called source codes.

The allocation information indicates to which resource (register) the variables used in each sentence of the source program are allocated, and each piece of the allocation information has ";;" at its beginning so that the allocation information is separated from each instruction. Note here that the program generated by the compiler core 1 does not have to be a primary assembler program, but it could be another program written in a language called an intermediate language which is a language interpretable within the compiling device.

Software Pipelining Unit 2

Figure 3:
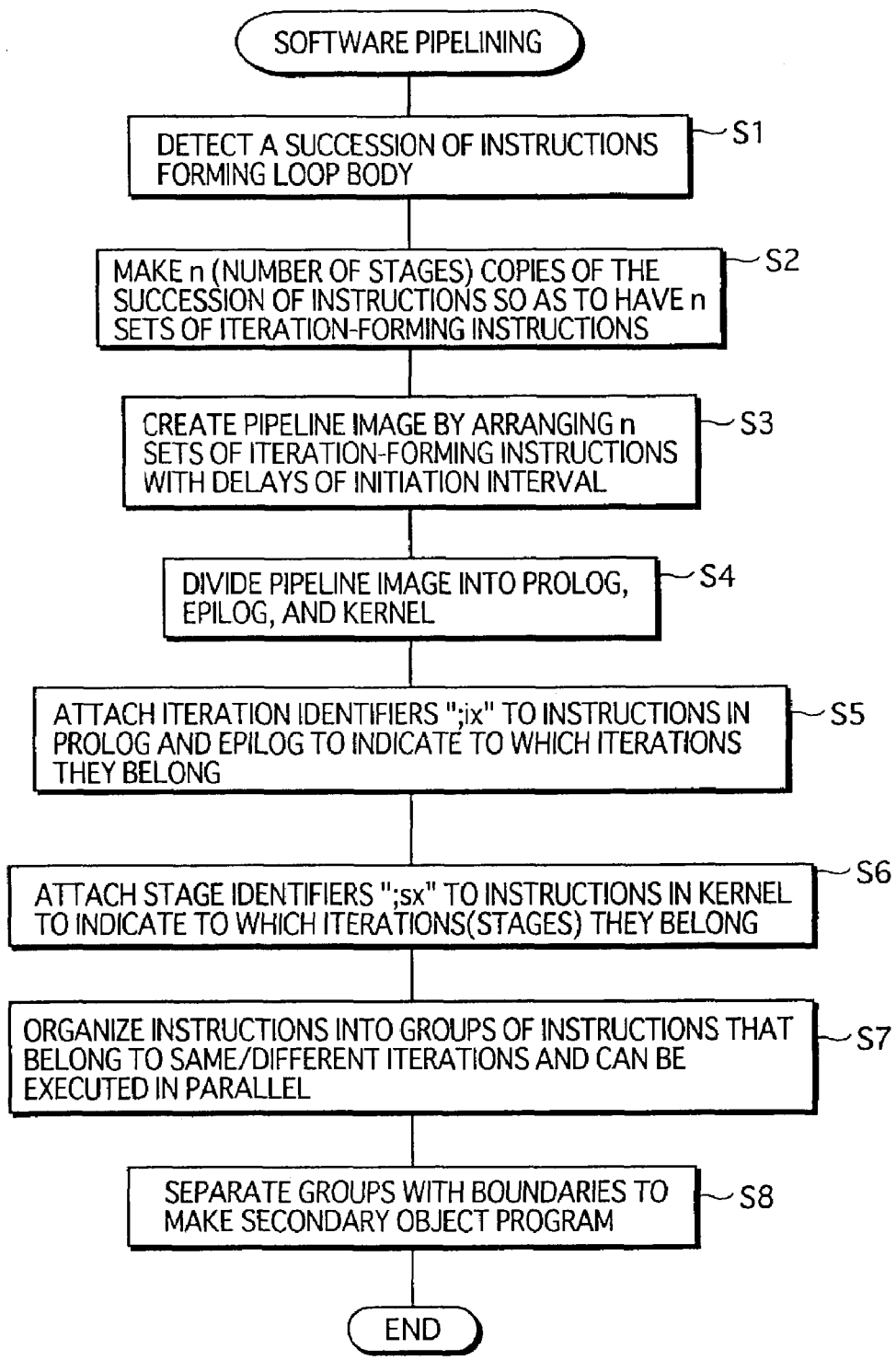
FIG. 3 is a flowchart showing the processing of the software pipelining unit 2.

The software pipelining unit 2 performs software pipelining of the primary assembler program. Software pipelining is to prepare as many iteration-forming instructions (simply called iteration instructions) as can be executed in pipelining parallelism, and to prearrange them so that they fit the pipeline of the target machine. The flowchart in FIG. 3 shows the processing of the software pipelining unit 2 in a simplified form. The following describes an outline of the processing of the software pipelining unit 2 with reference to FIG. 3. The software pipelining unit 2 detects a succession of instructions that forms the body of the loop from the primary assembler program (Step S1), and makes n copies of the succession of instructions where n is the number of the stages, so as to have n sets of iteration-forming instructions (simply called iteration instructions) (Step S2). In the program shown in FIG. 2B, the body of the loop is made up of Instruction A "ld (r10), r0" through Instruction H "blt loop", and there will be n copies of these instructions. A pipeline image is created by arranging n sets of iteration instructions so that each set is delayed from the previous set by an initiation interval (Step S3).

Figure 4A:
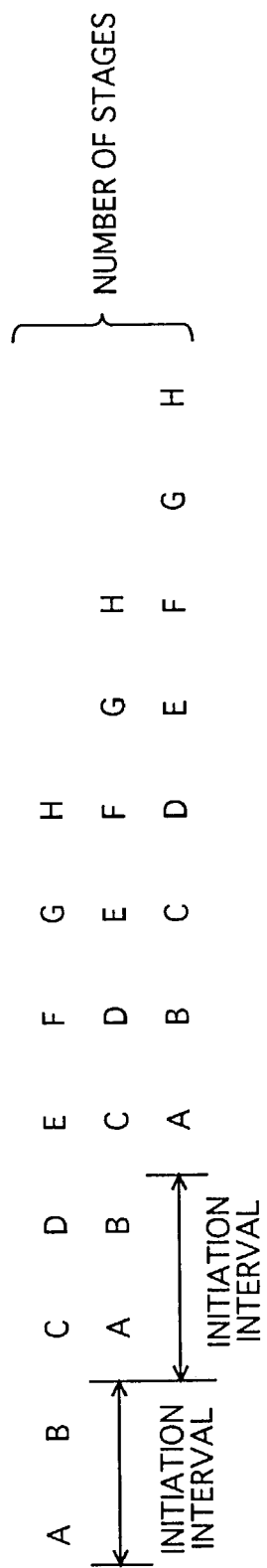
FIG. 4A is an example of a pipeline image in which Instruction A "ld (r10), r0" through Instruction H "blt loop" are arranged.
Figure 4B:
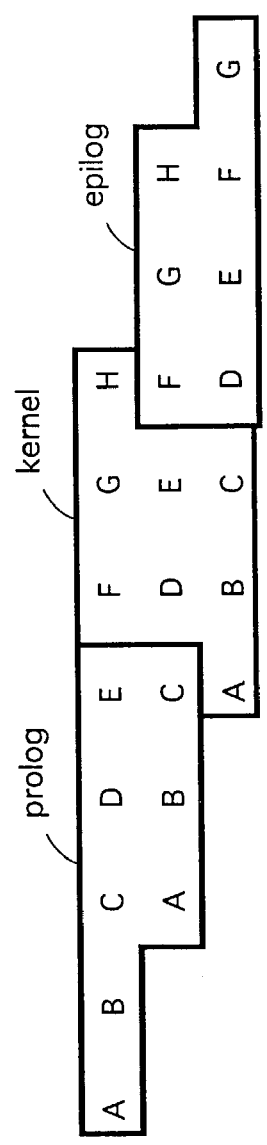
FIG. 4B is an example of a prolog, an epilog, and a kernel based on the pipeline image in FIG. 4A.
Figure 4C:
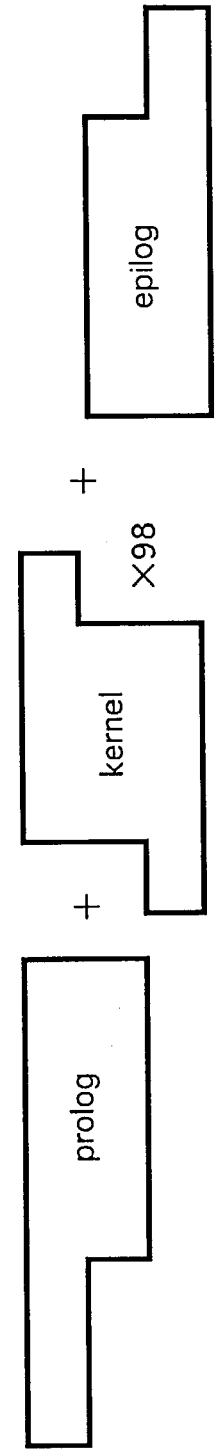
FIG. 4C shows how a prolog, a kernel and an epilogue are executed.

An initiation interval is an interval between the start of execution of an iteration and the start of execution of the next iteration. The smaller the value of an initiation interval is, the higher the speed of loop processing will be. FIG. 4A is an example of a pipeline image in which Instruction A "ld (r10), r0" through Instruction H "blt loop" are arranged with an initiation interval being two instructions. This pipeline image is divided into segments of a prolog, an epilog, and a kernel (Step S4). FIG. 4B is an example of the prolog, epilog, and kernel from the pipeline image of FIG. 4A. Since the body of the loop needs to be repeated 100 times, the kernel needs to be repeated 98 times (100 minus 2 times) as shown in FIG. 4C. Upon the pipeline image getting divided into segments, iteration identifiers ";ix" are attached to each of the instructions in the prolog and the epilog so as to indicate to which iteration each instruction belongs (Step S5), and stage identifiers ";sx" are attached to each of the instructions in the kernel so as to indicate to which iteration each instruction belongs (Step S6). The stage identifiers are to identify iterations within the kernel. The iteration identifiers show the relative order of iterations with the first iteration as the standard of relativity, whereas the stage identifiers show the relative order of iterations with the last iteration as the standard of relativity. That should be noted as a difference between the iteration identifiers and the stage identifiers. FIG. 5 is a pipeline image after the iteration identifiers and the stage identifiers are attached in Step S6.

Figure 7A:
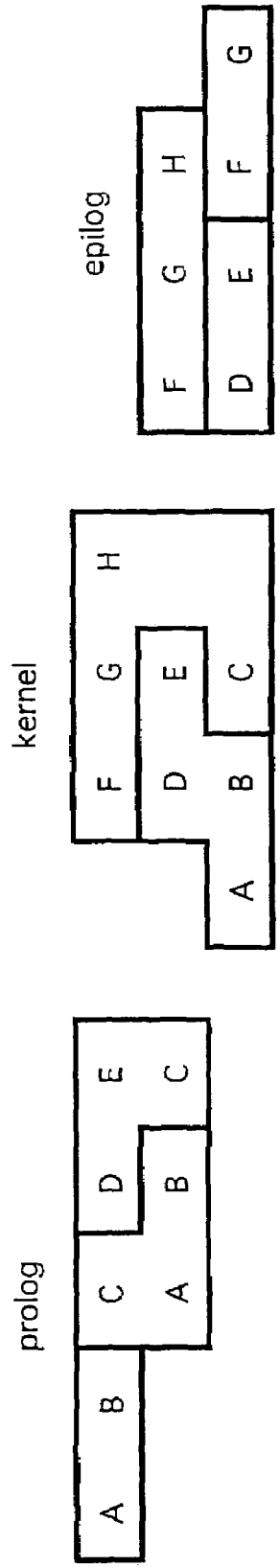
FIG. 7A and FIG. 7B show parallel execution blocks each made up of a group of instructions that can be executed in parallel.
Figure 7B:
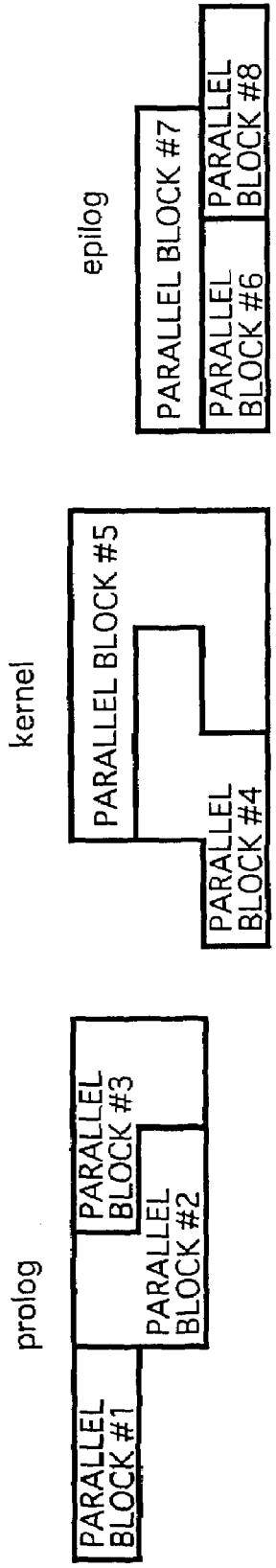

Subsequently, organize some of the instructions into groups of (a) instructions that belong to the same iteration and can be executed in parallel and (b) instructions that belong to different iterations and can be executed in parallel (Step S7). One possibility of parallel execution comes from instructions lined up in columns of the pipeline image. FIG. 6A and FIG. 6B show groups of instructions that can be executed in parallel based on FIG. 5. In the pipeline image of FIG. 5, the instructions lined up in each column are the instructions that belong to different iterations and can be executed in parallel as shown in FIG. 6A. Another possibility of parallel execution comes from the groups of instructions that have been detected when the compiler core 1 generated the primary assembler program. Those are instructions that belong to the same iteration and can be executed in parallel, and FIG. 6B shows examples. Groups of instructions that fall into one of these two possible cases can be executed in parallel. FIG. 7A and FIG. 7B show parallel execution blocks (in the drawing, simplified to "parallel blocks") each made up of a group of instructions that can be executed in parallel. As shown in the drawing, the prolog is made up of: Parallel Execution Block #1 with Instruction A "ld (r10), r0" and Instruction B "add r10, 4, r10"; Parallel Execution Block #2 with Instruction A "ld (r10), r0", Instruction B "add r10, 4, r10" and Instruction C "add r0, r5, r1"; and Parallel Execution Block #3 with Instruction D "mul r1, r6, r2", Instruction E "cmp r10, x+400", and Instruction C "add r0, r5, r1".

The kernel is made up of: Parallel Execution Block #4 with Instruction A "ld (r10), r0", Instruction B "add r10, 4, r10", Instruction D "mul r1, r6, r2", and Instruction E "cmp r10, x+400"; and Parallel Execution Block #5 with Instruction C "add r0, r5, r1", Instruction F "st r2, r (11)", Instruction G "add r11, 4, r11", and Instruction H "blt loop". The epilog is made up of: Parallel Execution Block #6 with Instruction E "cmp r10, x+400" and Instruction D "mul r1, r6, r2"; and Parallel Execution Block #7 with Instruction F "st r2, r (11)", Instruction G "add r11, 4, r11", and Instruction H "blt loop".

Among these instructions, Instruction E "cmp r10, x+400" is an instruction to judge the terminating condition of the loop; therefore, it does not have to be put into the prolog and the epilog. The kernel needs to be processed 98 times repeatedly. With these taken into consideration, and by separating a parallel execution block from another with a boundary, a secondary assembler program as shown in FIG. 8 will be obtained (Step S8).

FIG. 8 is the secondary assembler program as a result of Step S8. In FIG. 8, each of the Parallel Execution Blocks #1 through #8 is separated from one another with an end bit "E", which is a boundary. The instructions in each of the Parallel Execution Blocks have line numbers such as ";12", ";13", ";ln " and iteration identifiers such as ";i1", ";i2", ";i3", and stage identifiers such as ";s1", ";s2", ";s3" attached thereto.

The secondary assembler program outputted by the compiling device will be converted by an assembler into a relocatable codes, which are capable of being relocated. Further, a linker link-edits the relocatable codes to get a machine language program. A secondary assembler program generated by a compiling device is called a debug list since it is used in a debugging function, and thus distinguished from a machine language program. A machine language program generated by a compiling device, an assembler, and a linker together, as a result of translation, is called an object program in this description of the invention. Of a secondary assembler program, the program itself excluding iteration identifiers, stage identifiers, and line numbers is also called an object program, since it is a result of translation.

Program Operating Environment 3, Memory 4, and Processor 5

The program operating environment 3 is to provide the same hard ware environment as in the target machine in which the object program is to be installed. There are three possible forms such as (1) the target machine itself in which the memory 4 and the processor 5 are installed, or (2) an ICE (In-Circuit Emulator) board on which the memory 4 and the processor 5 are installed, or (3) a soft ware simulator to implement soft ware-wise the functions of the memory 4 and the processor 5.

The memory 4 stores a machine language program generated by a compiling device, an assembler, and a linker together.

The processor 5 comprises: (i) a program counter to hold a current access address for an object program, (ii) an instruction fetch circuit to fetch an instruction from a current address, (iii) an instruction register to store the fetched instruction, (iv) an instruction decoder to decode the instruction stored in the instruction register, (v) an arithmetic unit, (vi) general registers R0 through R15, (vii) a data memory, and (viii) a bus for transferring data and addresses. The processor 5 is able to execute three iterations with initiating intervals of two in pipelining parallelism. The processor 5 has two operational modes such as a user mode and a supervisor mode. The user mode is for executing the object program. The supervisor mode is for operation according to directions from a debugging aid device, and it is a mode for debugging. The processor is usually set to the user mode, and the switching from the user mode over to the supervisor mode is triggered by decoding and executing of a PI instruction. The PI instruction is an instruction that generates an interrupting signal for switching the operational mode from the user mode over to the supervisor mode, and is incorporated in an arbitrary location of the object program. It is possible to set a pass count for a PI instruction. In case a pass count is set, the program waits till the PI instruction gets decoded as many times as indicated in the pass count, and when the time comes, generates an interruption signal for switching the mode over to the supervisor mode.

Debugging Aid Device 6

The debugging aid device 6 gives various directions to the program in case the processor 5 is set to the supervisor mode, and stores the source program and the secondary assembler program (the debug list) that is generated by the soft ware pipelining unit 2, so as to perform debugging using these programs. As shown in FIG. 1, the debugging aid device 6 comprises a user interface 7, a window identifier attaching unit 8, an allocation information converting unit 9, a breakpoint setting unit 10, a program execution controlling unit 11, a one-step execution controlling unit 12, and a resource operating unit 13.

User Interface 7

Figure 9:
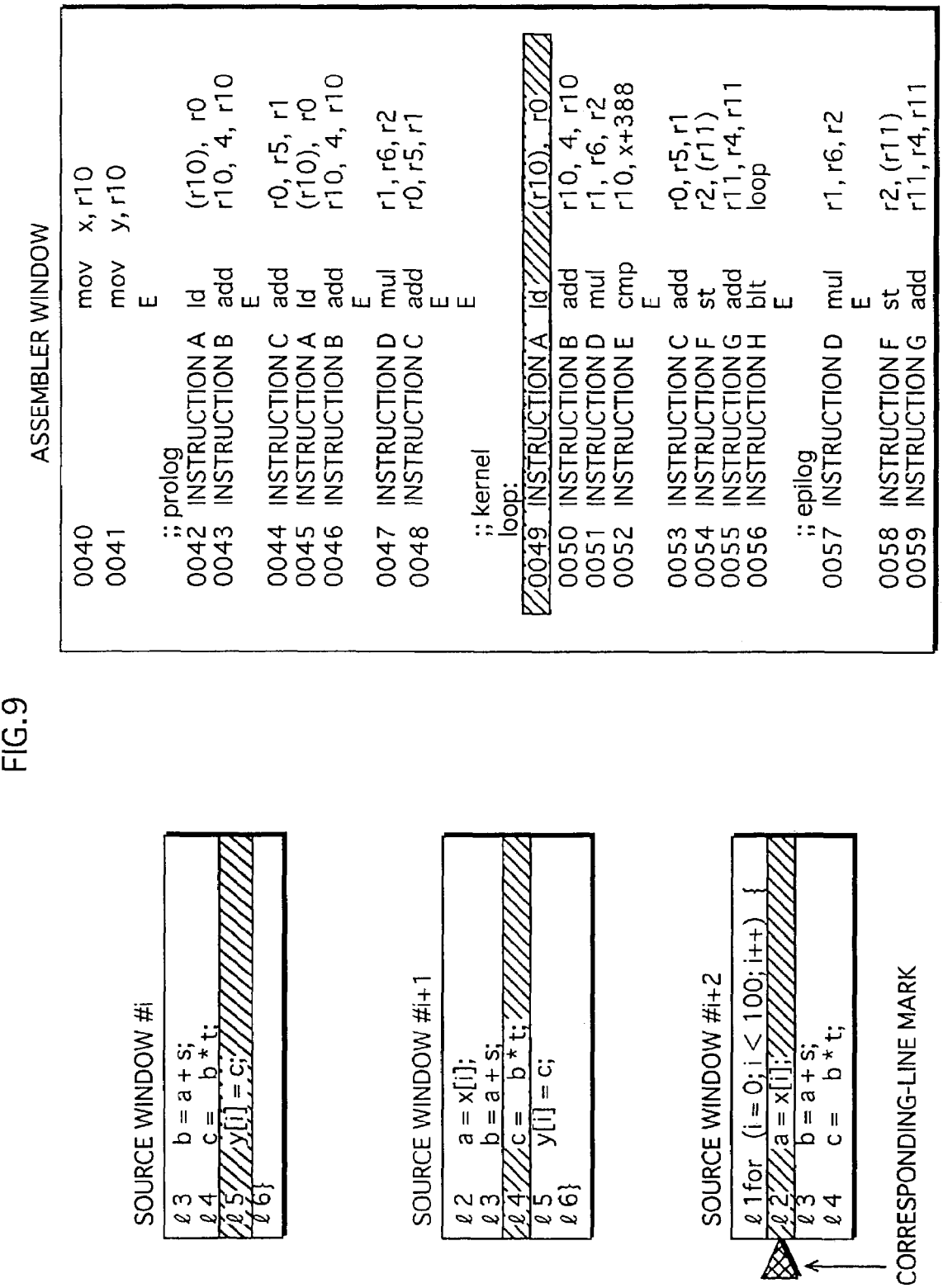
FIG. 9 shows interactive displays provided by the user interface 7.

The user interface 7 provides a user with an interactive operating environment with interactive displays as shown in FIG. 9. The interactive displays shown in FIG. 9 are an assembler window where an assembler list is displayed, and source windows #i, #i+1, and #i+2 where the source lists are displayed. The assembler list is a part of the secondary assembler program i.e. a debug list, and the current address where the processor 5 is executing at the moment is highlighted with hatching.

Figure 10:
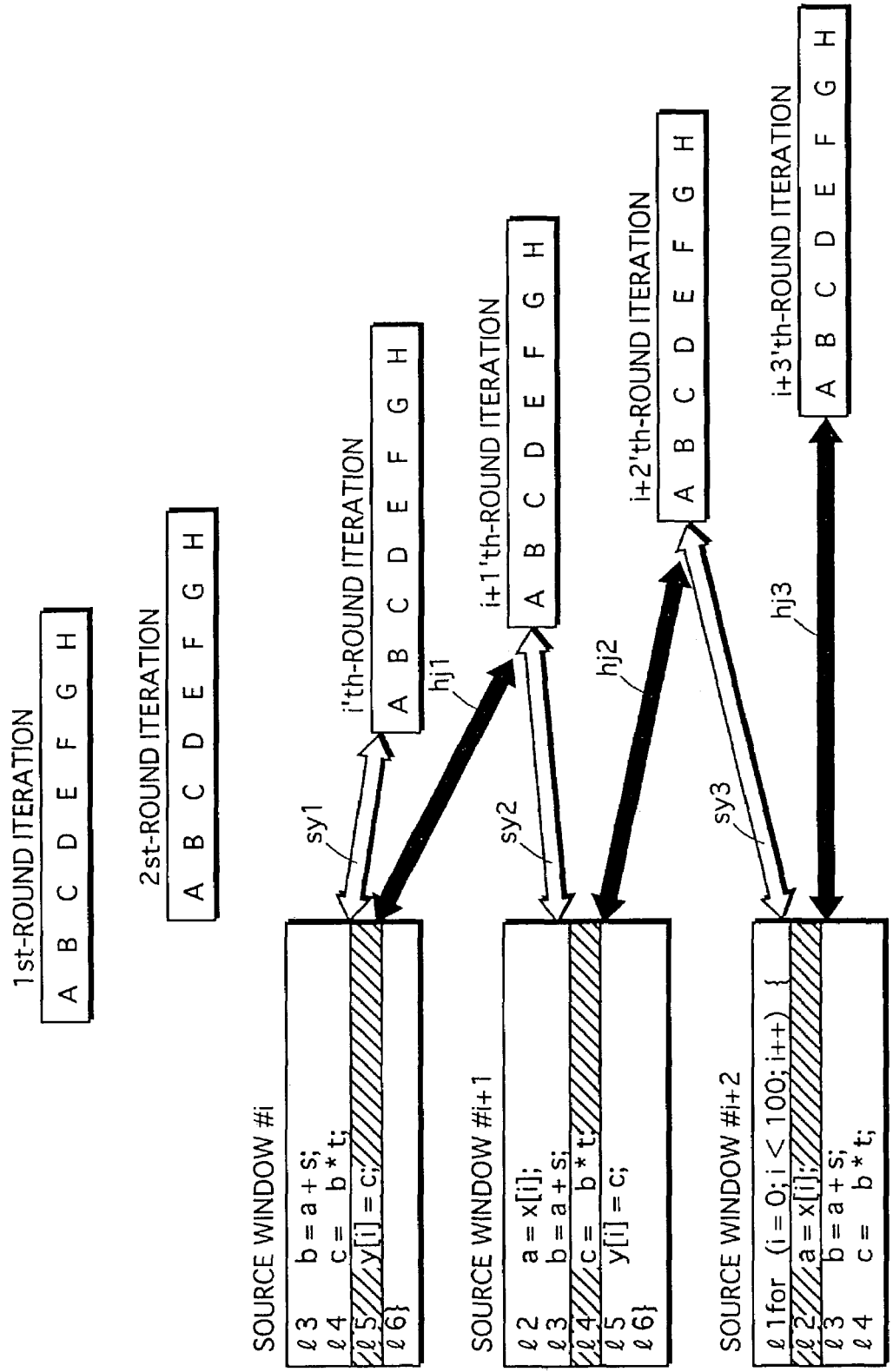
FIG. 10 shows correspondence between the source windows #i, #i+1, #i+2 and iterations of i'th round, i+1'th round, and i+2'th round.

The source lists are program lists for sentences included in the source program. A user is able to point to any sentence or instruction within the program lists by using a pointing device. Displayed are as many source windows as the number of iterations to be executed in parallel, and each source window is assigned to an iteration. FIG. 10 shows correspondence between the source windows #i, #i+1, #i+2 and i'th round, i+1'th round, i+2'th round iterations.

For example, when iterations of i'th round, i+1'th round, and i+2'th round are to be executed in parallel, each of these iterations is assigned to a source window in the processing order of i, i+1, i+2. That is to say, the i'th round iteration (the first one) is assigned to the source window #i as the arrow sy1 shows; the i+1'th round iteration is assigned to the source window #i+1 as the arrow sy2 shows; and the i+2'th round iteration (the last one) is assigned to the source window #i+2 as the arrow sy3 shows.

When i'th round iteration has been executed, i+1'th round iteration and i+2'th round iteration that used to be assigned to the source window #i+1, and the source window #i+2 respectively will be reassigned to the source window #i and the source window #i+1 respectively as the arrow hj1 and the arrow hj2 show. When i+3'th round iteration is generated, it will be assigned to the source window #i+2 as the arrow hj3 shows. Through such dynamic assignments, the user interface 7 is able to express in the windows the way those multiple iterations are processed in pipelining parallelism. Among the source windows #i, #i+1, and #i+2, a source window that corresponds to the current address will have a corresponding-line mark therein so as to be distinguished from other source windows. "A source window that corresponds to the current address" can be explained as follows: Instruction A "ld (r10), r0" which is at the current address 0049 in FIG. 9, has a stage identifier ";s1" and a line number ";12" attached in FIG. 8. Mean while, the source windows #i, #i+1, and #i+2 corresponds to the iterations of i'th, i+1'th, and i+2'th round respectively; consequently, the stage identifier ;s1 corresponds to the source window #i+2. Accordingly, the source window #i+2 corresponding to the stage identifier ;s1 is the "source window that corresponds to the current address". In addition, the current address 0049 has the line number ";12" attached, so line 2 in the source window has the corresponding-line mark to indicate that this sentence corresponds to the current address 0049. Furthermore, both of the source windows #i+1 and #i correspond to the iterations to be executed in parallel with the iteration of the current address; therefore, line 4 and line 5 are highlighted with hatching, besides line 2.

Window Identifier Attaching Unit 8

Figure 11:
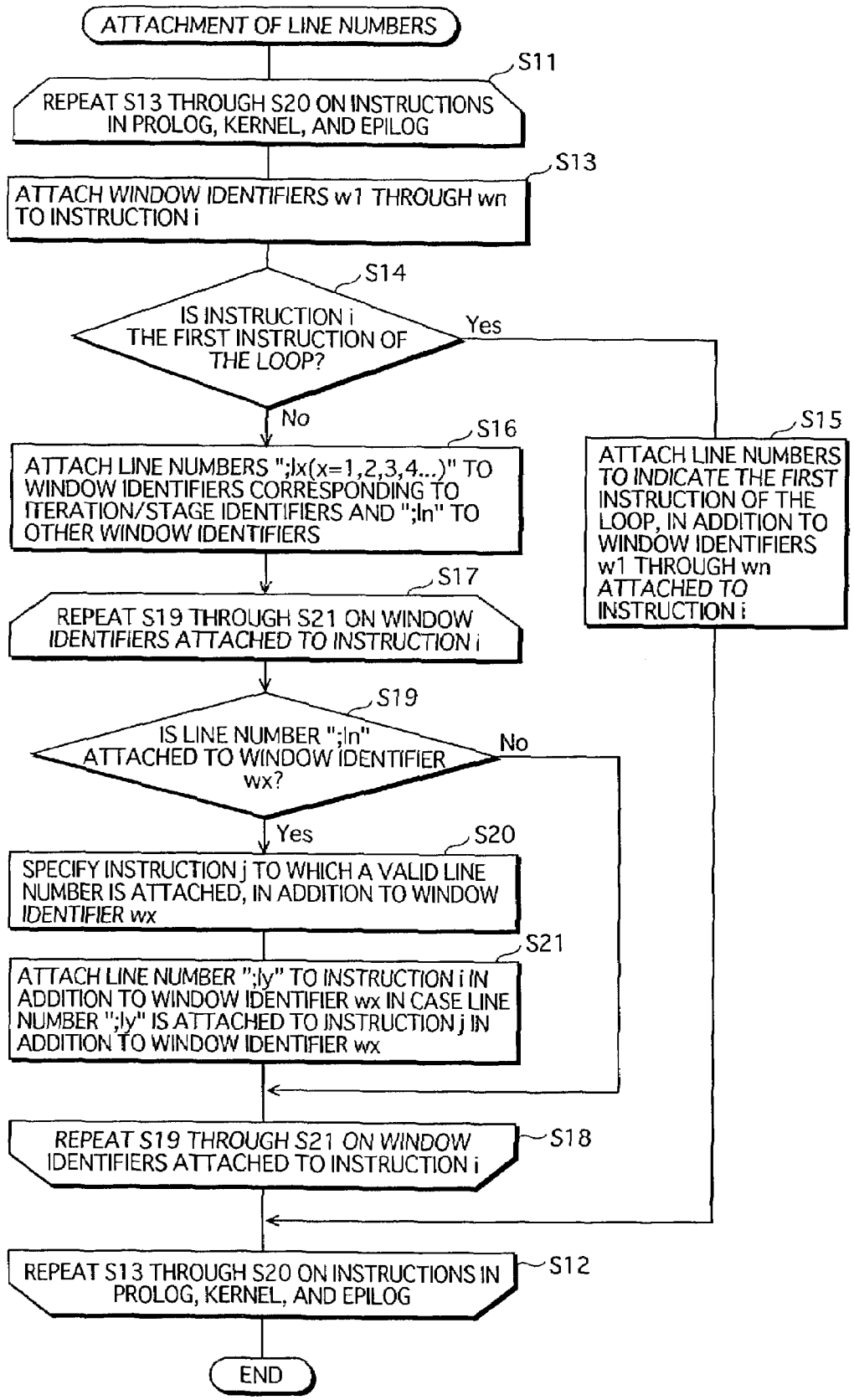
FIG. 11 is a flowchart showing the processing of the window identifier attaching unit 8.

The window identifier attaching unit 8 attaches a window identifier and a line number to each of instructions in the secondary assembler program, and its processing is shown in the flowchart of FIG. 11. The window identifiers identify each of the iterations to be executed in pipelining parallelism, and FIG. 12 shows examples of assignment of window identifiers to iterations. As shown in the drawing, window identifier w1 is assigned to the most preceding iteration, w2 to the following iteration, and w3 to the further following iteration. When the number of iterations is n, the number of window identifiers assigned to each instruction is also n. The window identifiers are similar to the idea of the iteration identifiers and the stage identifiers mentioned earlier, except for a difference as follows: in case of iteration identifiers (or stage identifiers) attached to an instruction is the iteration identifier of only the iteration to which the instruction belongs, whereas in case of window identifiers, not only a window identifier of the iteration to which an instruction belongs, but also the window identifiers of all other iterations to be executed in parallel will be attached to the instruction. That is why, when there are three iterations to be executed in parallel, three window identifiers are attached to each instruction in the iterations.

As shown in the flowchart in FIG. 11, there is a loop in which the Steps of S13 through S20 will be repeated on all the instructions in the prolog, kernel, and epilog (Steps S11 and S12). When an instruction in the repetition is referred to as Instruction i, after window identifiers w1 through wn are attached to Instruction i in Step S13, it is judged whether Instruction i is a first instruction of the loop in Step S14. In case Instruction i is a first instruction of the loop, the processing proceeds to Step S15, whereas in case Instruction i is not a first instruction of the loop, the processing proceeds to Steps S16 through S21. In Step S15, a line number attached to the first instruction of the loop will be attached to Instruction i in addition to window identifiers w1 through wn that have already been attached. At this time, the same line number as a first instruction of the loop will be attached to Instruction i. In Steps 16 through 21, some of the line numbers set as ";ln" will be replaced. More specifically, in Step S16, among window identifiers w1 through wn, the ones that correspond to iteration identifiers (stage identifiers) will have line numbers ";lx (x=1,2,3,4 . . . )" attached, whereas other window identifiers will remain with ";ln" attached.

FIG. 13 is a secondary assembler program as a result of attaching window identifiers and line numbers to the program of FIG. 8. In this drawing, the combinations of a window identifier and a line number marked with boxes include valid line numbers such as ";12", ";13", and ";14", whereas the combinations of a window identifier and a line number that are not marked with boxes include an invalid line number, ";ln".

Subsequently, Steps S19 through S21 will be executed on each of window identifiers w1 through wn attached to the instructions (Steps S17 and S18). Here, a window identifier processed in the repetition of Steps S19 through S21 is referred to as "window identifier wx". When window identifier wx has a line number ";ln" attached thereto, the line number ";ln" will be replaced with a line number ";ly" which is attached to Instruction j (Step S21) Here, Instruction j is an instruction to which a valid line number is attached, and it will be specified in Step S20.

There are various ways of specifying an instruction as Instruction j. The most desirable way is to specify, as Instruction j, an instruction that belongs to the same parallel execution block as the Instruction i, and that has window identifier wx and a valid line number attached thereto. If Instruction j is an instruction that is in the same parallel execution block as the Instruction i, then Instruction j and Instruction i will be executed simultaneously, thus, it is possible to display in a plurality of source windows a plurality of source codes that correspond to a plurality of instructions to be executed simultaneously. This way it is possible to understand clearly which source code and which source code are to be executed simultaneously.

The following describes addition to window identifiers in Steps S20 and S21 with reference to FIGS. 14A and 14B. Here, Instruction B "add r10, 4, r10" located at address 0050 will be taken as Instruction i.

FIG. 14A shows a program after the processing of Steps S20 and S21. In FIG. 14A, Instruction B "add r10, 4, r10" located at address 0050 has ";ln" attached thereto in addition to window identifiers w1, w2, and w3, so Steps S20 and S21 will be executed on window identifiers w1, w2, and w3 that are attached to Instruction B "add r10, 4, r10". According to the desirable way of specifying Instruction j mentioned above, an instruction that is in the same parallel execution block and that has a valid line number attached thereto in addition to window identifier wx should be selected as Instruction j. As for w1, Instruction A "ld (r10), r0" in the kernel located at address 0049 will be detected as Instruction j. As for w2, Instruction D "mul r1, r6, r2" in the kernel located at address 0051 will be detected as Instruction j. As for w3, since there is no valid line number in the same parallel execution block, Instruction j will not be detected. Thus, the line numbers attached to these Instruction j's are specified as line numbers "ly" as shown with arrows jy1 and jy2. When this kind of processing is performed on all window identifiers with a line number ";ln", a secondary assembler program shown in FIG. 14B will be obtained. It should be noted here that the program shown in FIG. 14B does not have iteration identifiers and stage identifiers displayed, but they are actually included in the secondary assembler program. They are just not shown in the drawing. Iteration identifiers and stage identifiers have a different role than window identifiers. If there were no iteration identifiers or stage identifiers, it would be impossible to specify to which stage or iteration an instruction belongs.

If you have a condition that Instruction j should be in the same parallel execution block, then there are many cases where there is no instruction to which a valid line number is attached and, thus it is not possible to specify Instruction j. The Parallel Execution Blocks #1, #2, and #3 in FIG. 14B show this exact case. More specifically, window identifiers w1's in the Parallel Execution Blocks #1, #2, and #3 do not have a valid line numbers attached; therefore, none of those instructions can be specified as Instruction j.

In order to replace as many ";ln "'s as possible with specific line numbers, it is also acceptable not to use the condition of Instruction j being in the same parallel execution block. More specifically, it is possible to set the condition of Instruction j as "an instruction that is located forward of the Instruction i and that has a valid line number attached thereto in addition to window identifier wx". This condition may be used for specifying Instruction j in Step S20.

The following describes addition to window identifiers in Steps S20 and S21 with reference to FIGS. 15A and 15B. Here, Instruction A "ld (r10), r0" located at address 0042 will be taken as Instruction i.

FIG. 15A shows a program after the processing of Steps S20 and S21. In FIG. 15A, Instruction A "id (r10), r0" located at address 0042 has ";12" attached thereto in addition to window identifier w3, but ";ln" is attached to w1 and w2. Accordingly, window identifiers w1 and w2 attached to Instruction A "ld (r10), r0" will go through processing of Steps S20 and S21. As for w1, Instruction A "ld (r10), r0" in the kernel located at address 0049 will be detected as Instruction j. As for w2, Instruction D "mul r1, r6, r2" in the kernel located at address 0051 will be detected as Instruction j. Thus, the line numbers ";12" and ";14" attached to these Instruction j's are specified as line numbers "ly" as shown with arrows jy1 and jy2. When this kind of processing is performed on all window identifiers with a line number ";ln", a secondary assembler program shown in FIG. 15B will be obtained.

When FIG. 15B is compared with FIG. 14B, some window identifiers in the boxes have different line numbers attached. Besides, there are more ";ln" remaining in FIG. 14B than in FIG. 15B as explained above; however, in FIG. 14B, it is possible to accurately display in a plurality of source windows a plurality of source codes that correspond to a plurality of instructions, because the condition of Instruction j is limited to being in the same parallel execution block as Instruction i. It would depend on the programmer's subjective opinion whether the method in FIG. 14B is preferable or the method in FIG. 15B is preferable; consequently, it would be desired that the window identifier attaching unit 8 is able to perform in either of the methods.

Allocation Information Converting Unit 9

Figure 16:
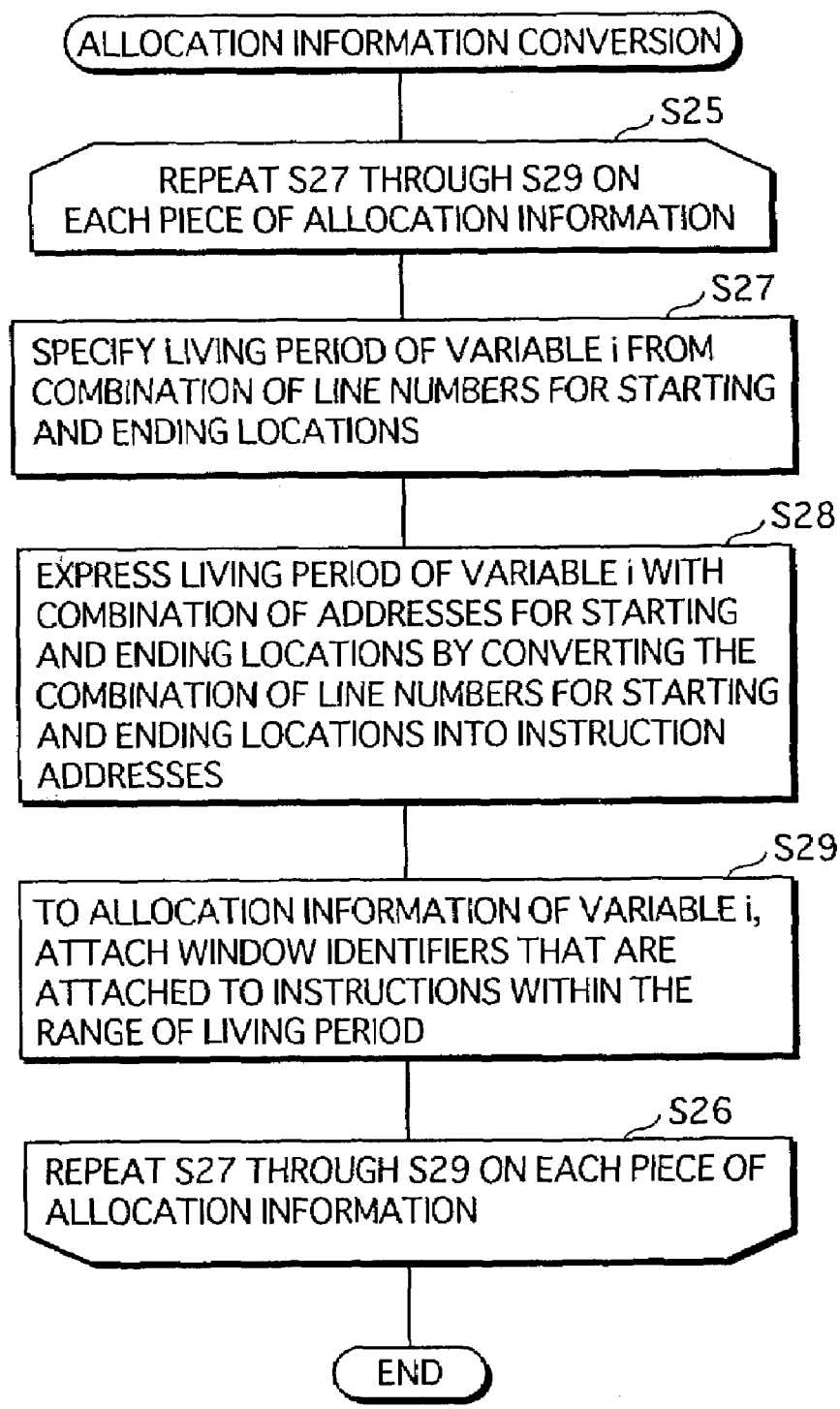
FIG. 16 is a flowchart showing the processing of allocation information converting unit 9.

The allocation information converting unit 9 prearranges allocation information for debugging, and FIG. 16 is a flowchart showing the processing of allocation information converting unit 9. As shown in the flowchart, there is a loop in which the allocation information converting unit 9 repeats the Steps S27 through S29 on each piece of allocation information (Steps S25 and S26). In Step S27, the allocation information converting unit 9 performs general living period analysis, and determines the living period of variable i with use of a combination of line numbers of both a starting location and an ending location. Subsequently, the allocation information converting unit 9 converts the combination of the line numbers of the starting location and ending location into instruction addresses in order to generate living period information of variable i expressed with a combination of addresses of starting location and ending location, and attach the living period information to the allocation information (Step S28). Further, window identifiers that are attached to instructions within the range of the living period will be attached to the living period information of variable i (Step S29). The processing so far mentioned will be repeated on each piece of allocation information. In the example shown in FIG. 2A, the living period of variable a is 12 to 13, the living period of variable b is 13 to 14, the living period of variable c is 14 to 15. These line numbers are converted to addresses, and window identifiers are attached to the converted addresses, so that allocation information to which living period information is attached as shown in FIG. 17 will be obtained. It should be noted that there are a plurality of pieces of living period information for variable a and variable b in FIG. 17. The reason is because a plurality of iteration-forming instructions are generated from a body, and a combination of line numbers is converted into a plurality of combinations of addresses. (Please note that the examples of programs in FIGS. 17, 19, 21, 22, 24, 25, 27, 28, 29 are according to the addition to window identifiers of FIG. 15B, not FIG. 14B.)

Program Execution Controlling Unit 11

Figure 18:
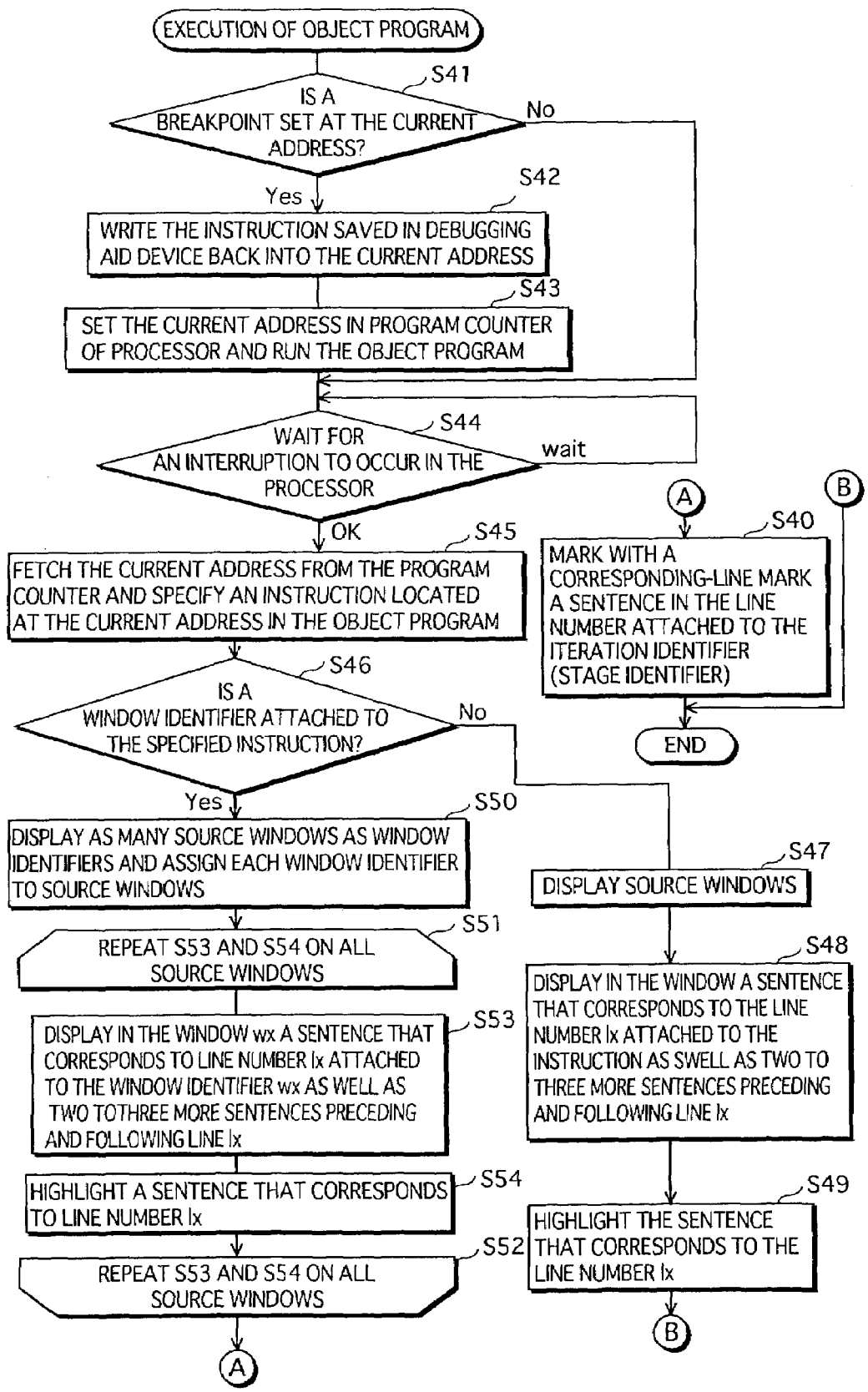
FIG. 18 is a flowchart showing the processing of the program execution controlling unit 11.

The program execution controlling unit 11 makes the processor execute the object program, and its processing is shown in the flowchart of FIG. 18. In the flowchart of FIG. 18, Step S41 is a branch-on-condition step where whether a breakpoint is set at the current address decides whether Steps S42 and S43 will be skipped or executed. Steps S42 and S43 are necessary to be executed in case a breakpoint is set at the current address. In Step S42, the instruction that is saved in the debugging aid device is written back into the current address. In Step S43, the current address is set in the program counter of the processor, and the object program will run. Then, after the branch-on-condition step of S41, the processing proceeds to Step S44 where an event will be waited for. The event being waited for in Step S44 is an interruption for mode switching occurring in the processor. When this event occurs, the current address in the program counter will be fetched, and an instruction located at the current address in the object program will be specified (Step S45). Subsequently, it is judged whether the specified instruction has a window identifier attached (Step S46), and depending on the result of the judgment, either Steps S47 through S49 or Steps S50 through S54 plus S40 will be selected to be executed. In case the specified instruction does not have a window identifier attached, a source window will be displayed (Step S47), and displayed in window wx are a sentence that corresponds to the line number lx attached to the specified instruction as well as two to three more sentences preceding and following line lx (Step S48), and the sentence that corresponds to the line number lx will be highlighted (Step S49).

Alternatively, in case the specified instruction has a window identifier attached, as many source windows as the number of the window identifiers will be displayed, and a window identifier will be assigned to each source window. After that, Steps S53 and S54 will be repeated on all the source windows. A window identifier to be processed at the repetition is referred to as "window identifier wx". Displayed in window wx are a sentence corresponds to line number lx attached to the window identifier wx as well as two to three more sentences preceding and following line lx (Step S53), and the sentence that corresponds to line number lx will be highlighted (Step S54). These Steps of S53 and S54 will be repeated on all the source windows. When this repetition is completed, in a source window that corresponds to the iteration identifier (stage identifier) attached to the specified instruction, a sentence that corresponds to the line number attached to the particular iteration identifier (stage identifier) will be marked with a corresponding-line mark (Step S40) and the processing comes to an end.

Figure 19:
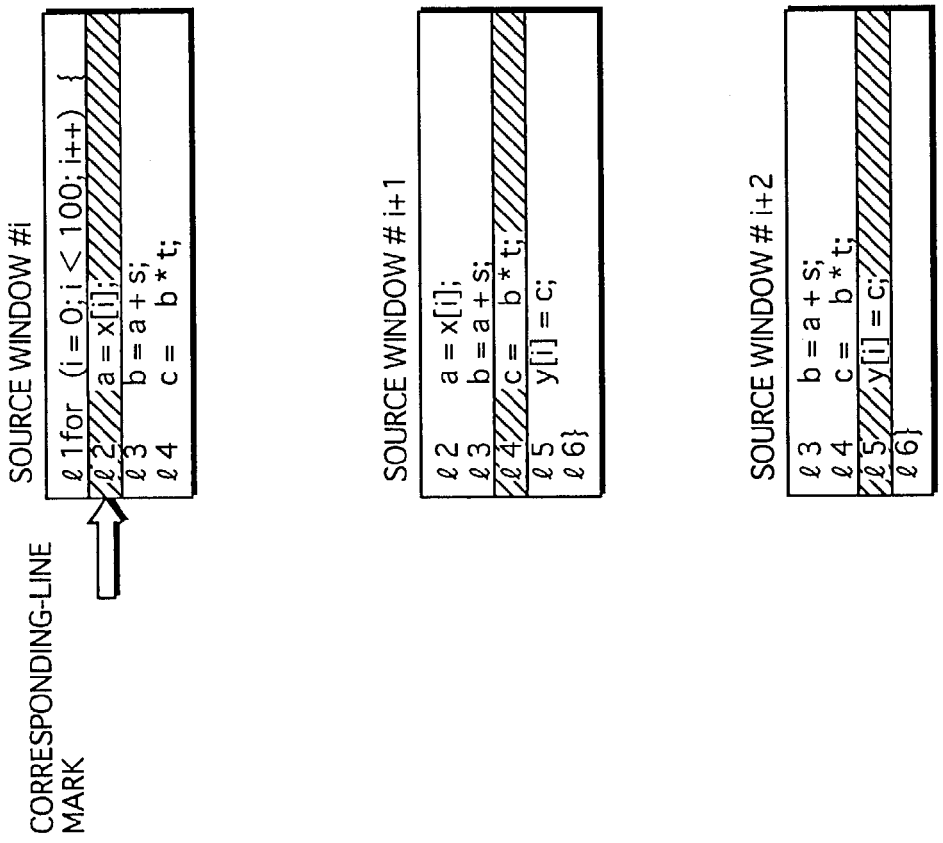
FIG. 19 shows examples of allocation information for the secondary assembler program.

FIG. 19 shows examples of source windows displayed in the processing of Steps S51 through S54. This drawing is based on a premise that a breakpoint is set at address 0049. Since the Instruction A "ld (r10), r0" located at this address has three window identifiers such as w1, w2, and w3 attached, three source windows are displayed, and the sentences that correspond to the line numbers attached to those window identifiers, namely 12, 14, and 15, are highlighted with hatching. In order to show that each of a plurality of sentences belongs to mutually different iterations, it would be preferable to display each of the plurality of sentences in different manners.

Breakpoint Setting Unit 10

Figure 20:
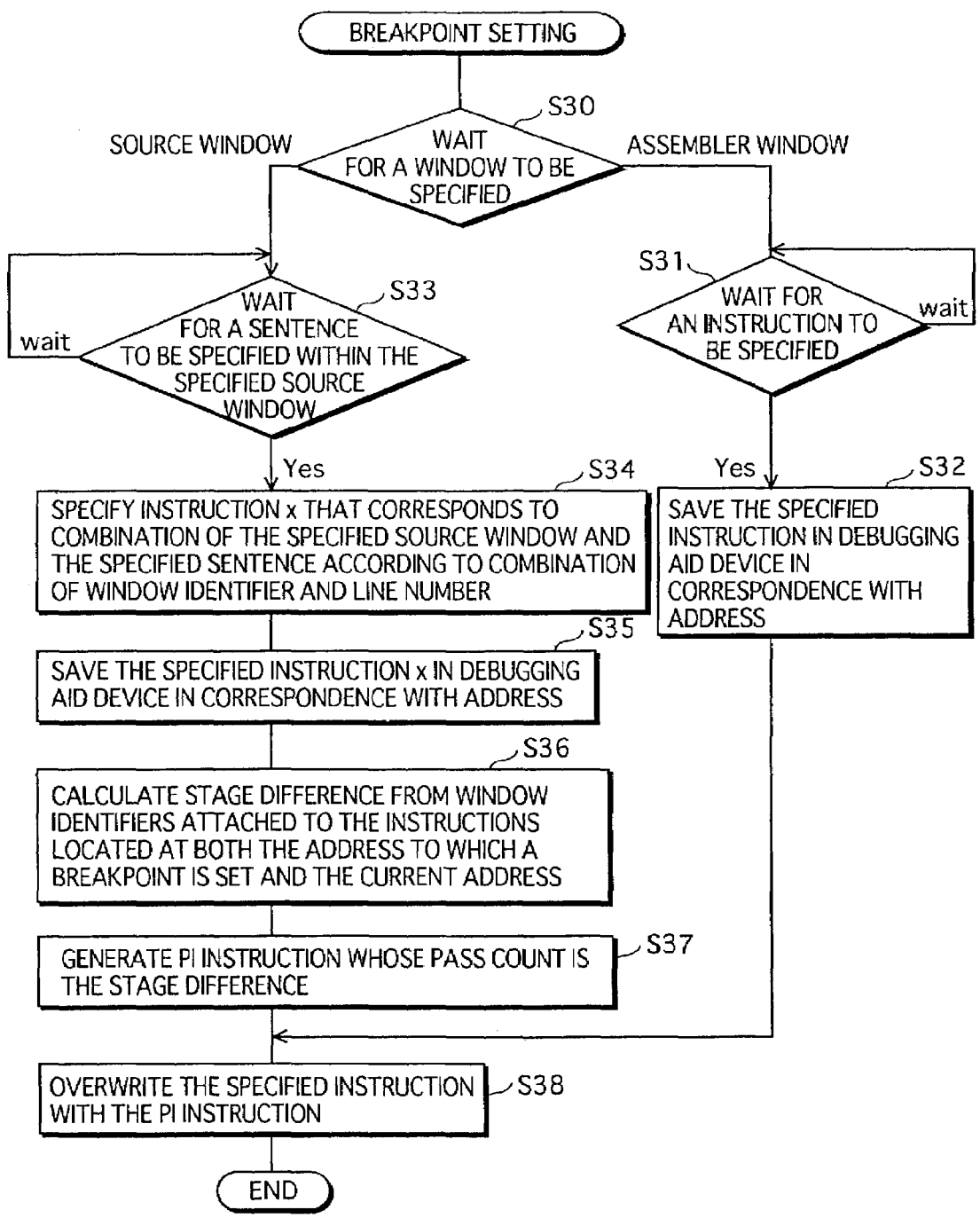
FIG. 20 is a flowchart showing the processing of the breakpoint setting unit 10.

The breakpoint setting unit 10 sets breakpoints in the object program inside the memory 4 in the program operating environment 3, and its processing is shown in the flowchart in FIG. 20. As shown in the flowchart in FIG. 20, at first a kind of a window is selected by the user, and depending on which window is selected by the user, either Steps of S31 and S32 or Steps of S33 through S37 will be selected to be executed. In case an assembler window is selected by the user, the processing proceeds to Step S31.

In Step S31 an event is waited for, and the event being waited for is that an instruction displayed in the assembler window gets specified. When the instruction gets specified, Steps of S32 and S38 will be executed subsequently. In Step S32, the specified instruction will be fetched from the memory, and will be saved in the debugging aid device in correspondence with an address. After that, in Step S38, the specified instruction will be overwritten with a PI instruction. This processing is exactly the same as a setting process executed in a debugging aid device of the prior art.

Alternatively, in case a source window is selected by the user, Steps S34 through S38 will be executed with Step S33 being a trigger. In Step S33 an event is waited for, and the event being waited for is that the user specifies a sentence in the specified source window. When a sentence is specified, the processing proceeds to Step S34 through S36 subsequently. More specifically, instruction x that corresponds to a combination of the specified source window and the specified sentence will be specified according to a combination of a window identifier and a line number (Step S34), and the specified instruction x will be saved in the debugging aid device in correspondence with an address. Subsequently, a stage difference will be calculated from (a) the window identifier attached to the instruction at the address to which a breakpoint is set and (b) the window identifier attached to the instruction at the current address (Step S36), a PI instruction whose pass count is the stage difference will be generated (Step S37), and the specified instruction will be overwritten with the PI instruction (Step S38). These Steps of S33 through S38 are characterized in that an instruction that corresponds to both a source window and a sentence will be derived from a combination of a window identifier and a line number.

Figure 21:
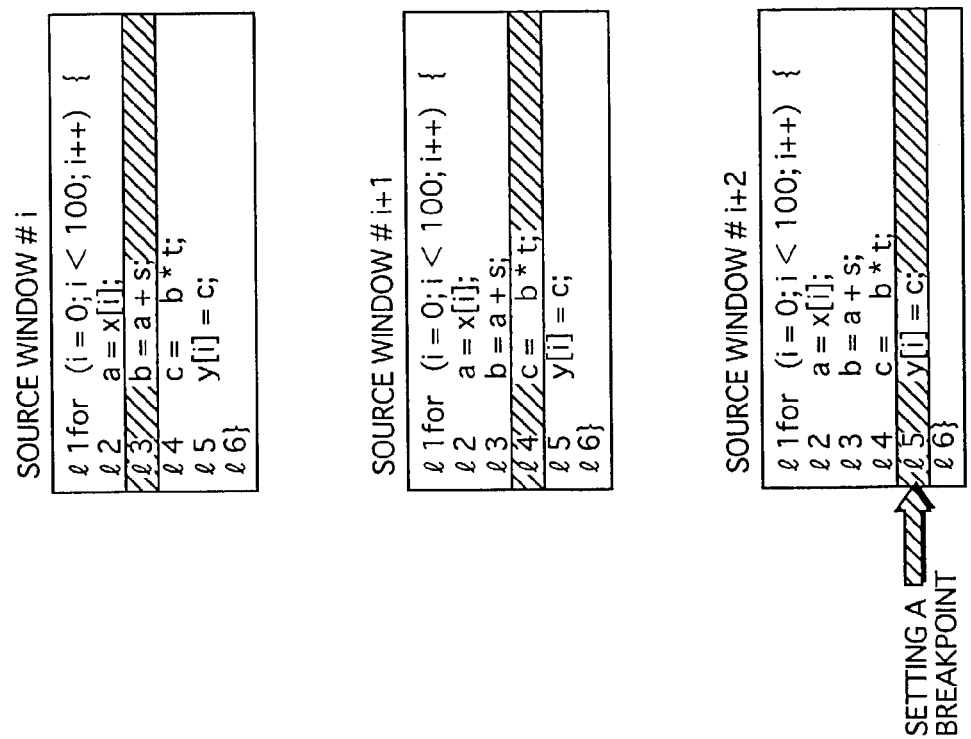
FIG. 21 shows examples of operations of the breakpoint setting unit 10.
Figure 22:
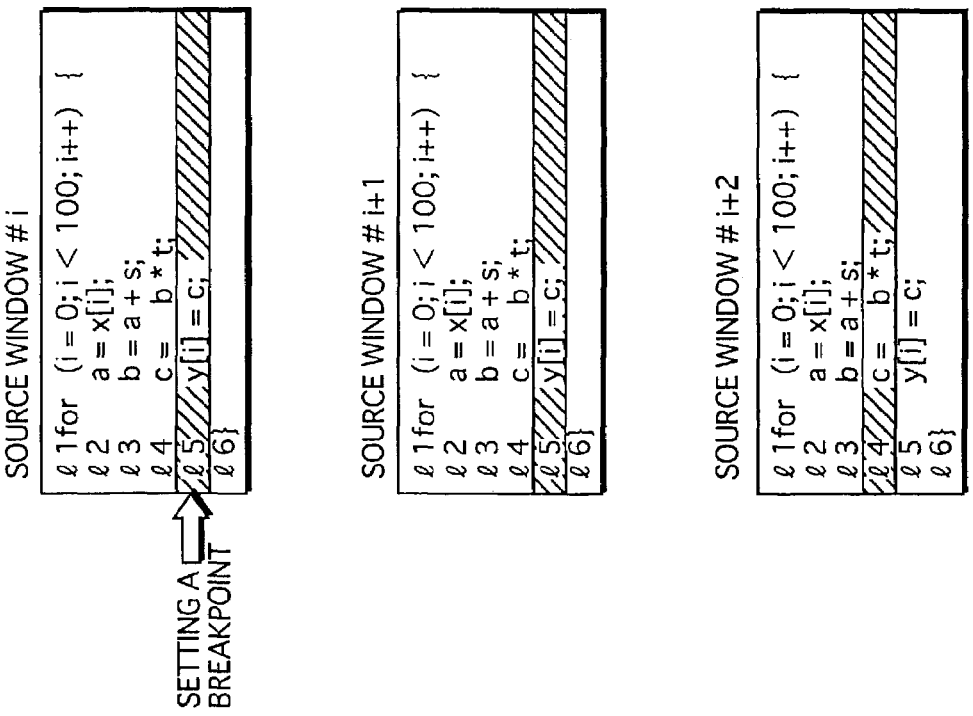
FIG. 22 shows examples of displays when the object program halts at the breakpoint.

The following describes the processing of the breakpoint setting unit 10 with reference to FIGS. 21 and 22. In FIG. 21, the source windows #i, #i+1, #i+2 are assigned to $1^{st}$—round, $2^{nd}$—round and $3^{rd}$—round iterations respectively. The current address is at address 0050. In FIG. 8, the stage identifier attached to this address 0050 is ";s1" and this address, as an origin, corresponds to the $1^{st}$—round stage of the kernel.

Here, the user is about to set a breakpoint in line 5 of the source window #i+2. The source window #i+2 corresponds to the $3^{rd}$—round iteration and the stage identifier is ;s3. The line number ";15" is attached to ";s3" at address 0054.

On the other hand, the current address 0050 corresponds to the $1^{st}$—round iteration, so the difference in the stage numbers, which is "2", will be attached as a pass count, and address 0054 will be overwritten with PI instruction (Step S38). Subsequently, when the execution of the machine language program has started, the processing will pass over the breakpoint set at the instruction of address 0054 twice and, for the third time, the processing halts at address 0054 because of the PI instruction coming into action. FIG. 22 shows displays at the time of the halt. In FIG. 21, the $3^{rd}$—round iteration is shown in source window #i+2, but in FIG. 22, the $3^{rd}$—round iteration has moved to source window #i, and instead, the $4^{th}$—round and $5^{th}$—round iterations currently being executed are assigned to source windows #i+1 and #i+2 respectively. From FIG. 22, it is understood that each of the source windows is at a halt in line 5, line 5, and line 4 respectively.

One-step Execution Controlling Unit 12

Figure 23:
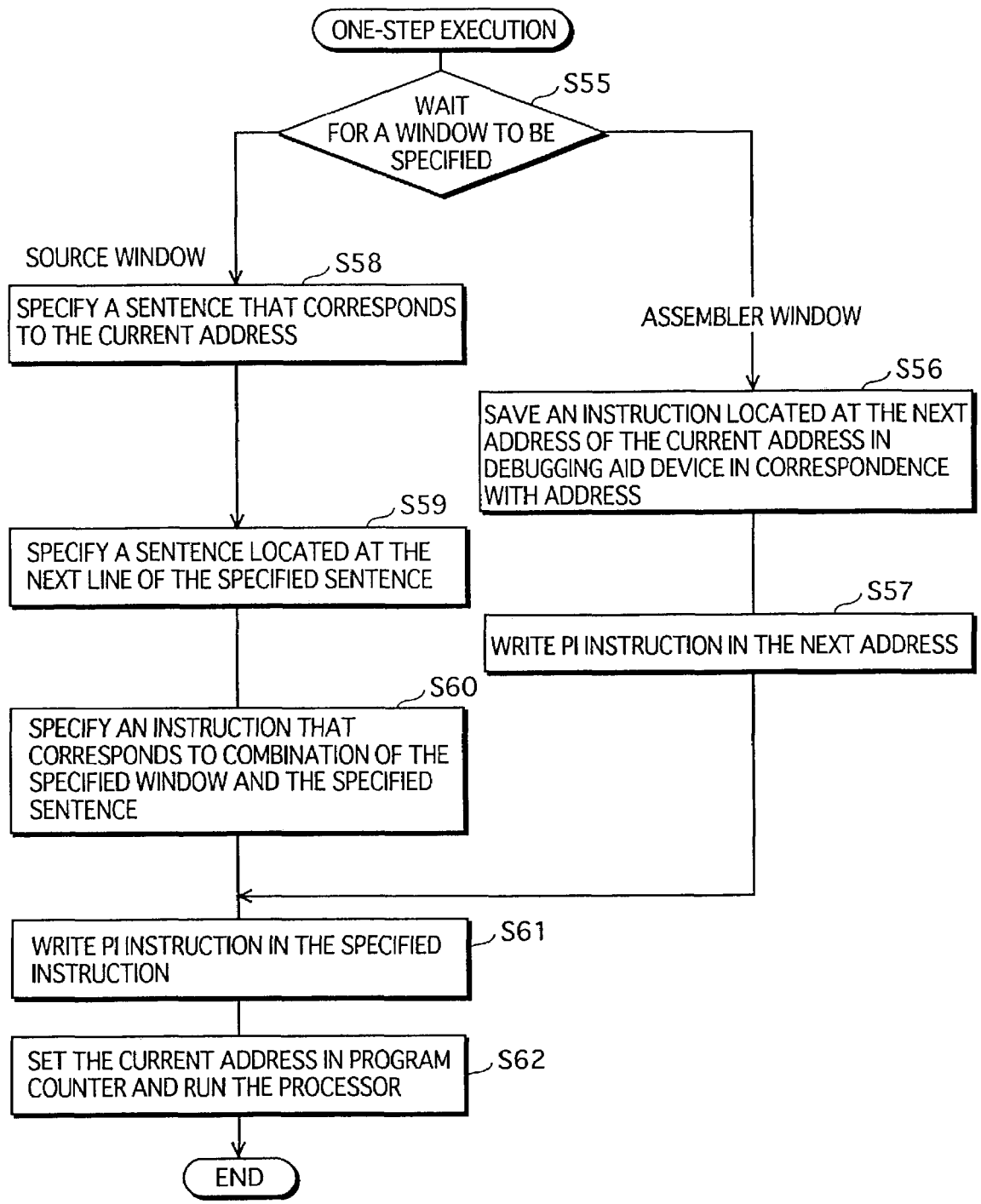
FIG. 23 is a flowchart showing the processing of the one-step execution controlling unit 12.

The one-step execution controlling unit 12 sets a breakpoint in the object program, and its processing is shown in the flowchart in FIG. 23. As shown in the flowchart in FIG. 23, Step S55 is a branch-on-condition step where, depending on which window is selected by the user, either Steps S56 and S57 or Steps S58 through S60 will be selected to be executed. In case an assembler window is selected by the user, the instruction located at the next address of the current address will be saved in the debugging aid device in correspondence with an address (Step S56), and a PI instruction will be written in the next address (Step S57). In case a source window is selected by the user, a sentence that corresponds to the current address will be specified (Step S58), a sentence that is located in the next line of the specified sentence will be specified (Step S59), an instruction that corresponds to a combination of the specified window and the specified sentence will be specified (Step S60), the specified instruction will be overwritten with the PI instruction (Step S61), and the current address is set at the PI instruction and the processor will run (Step S62). After that, the one-step execution controlling unit 12 performs the processing of Steps S44 through S54 and S40 shown in FIG. 18 in the same way as the program execution controlling unit 11 does. (To be simple, these steps are omitted from FIG. 23.) FIG. 24 shows an example of one-step execution in the assembler window, and FIG. 25 shows an example of one-step execution in the source window. FIG. 24 is based on a premise that the current address is at 0049 as shown with the arrow cy1. When one step is executed to the current address 0049 in the assembler window, an interruption occurs upon 0050 becoming the current address as shown with the arrow cy2. On the other hand, when one step is executed to the same current address 0049 but in the source window, a line number "14" corresponds to the current address 0049 as shown with the arrow ry1, so an interruption occurs upon the processing reaching the next line "15" as shown with the arrow ry2. Since the line number "15" corresponds to the address 0054 as shown with the arrow ry3, it is understood that the interruption occurs upon the processing reaching address 0054.

Resource Operating Unit 13

Figure 26:
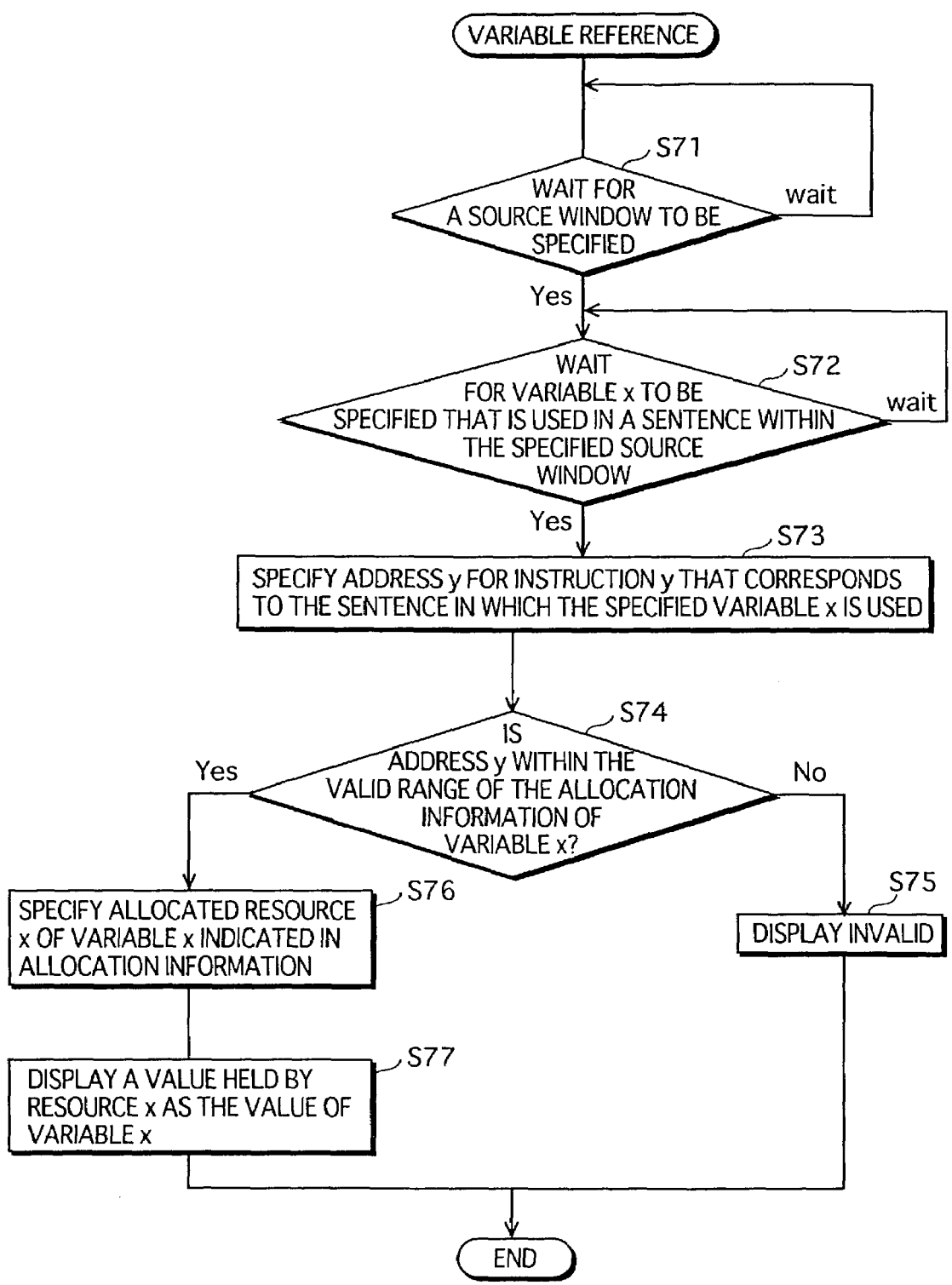
FIG. 26 is a flowchart showing the processing of the resource operating unit 13.

The resource operating unit 13 performs resource operations of the hard ware resource in the program operating environment 3. There are two ways of hard ware resource operations such as writing a value into the resources and referring to the value held in the resources. There are two kinds of hard ware resources such as the resource stored in the registers R0 through R5 in the processor 5 and the resource stored in the target memory 4. The resource operating unit 13 in this embodiment is characterized in that it performs resource operations with use of variables. Referring to the resource with use of variables is shown in the flowchart in FIG. 26. The following describes how the resource operating unit 13 refers to the resource, with reference to the flowchart. In the flowchart in FIG. 26, in each of Steps S71 and S72, an event is waited for. The event being waited for in S71 is that the user specifies a source window, and the event being waited for in S72 is that a variable x which is used in a sentence inside the specified source window gets specified. When these events occur in Steps S71 and S72, which are to be processed in serial, the processing proceeds to Step S73, and then to Step S74. Step S74 is a branch-on-condition step where, depending on whether address y is within the valid range of the allocation information of variable x, either Step S75 or Steps of S76 and S77 is selected to be executed. Here, address y is an address of instruction y which corresponds to a sentence in which the specified variable x is used, and address y is specified in Step S73. In case address y is not within the valid range of the allocation information of variable x, "Invalid" will be displayed in Step S75, whereas in case address y is within the valid range, allocated resource x of variable x indicated in allocation information will be specified (Step S76), and a value held by resource x will be displayed as the value of variable x (Step 77).

Figure 27:
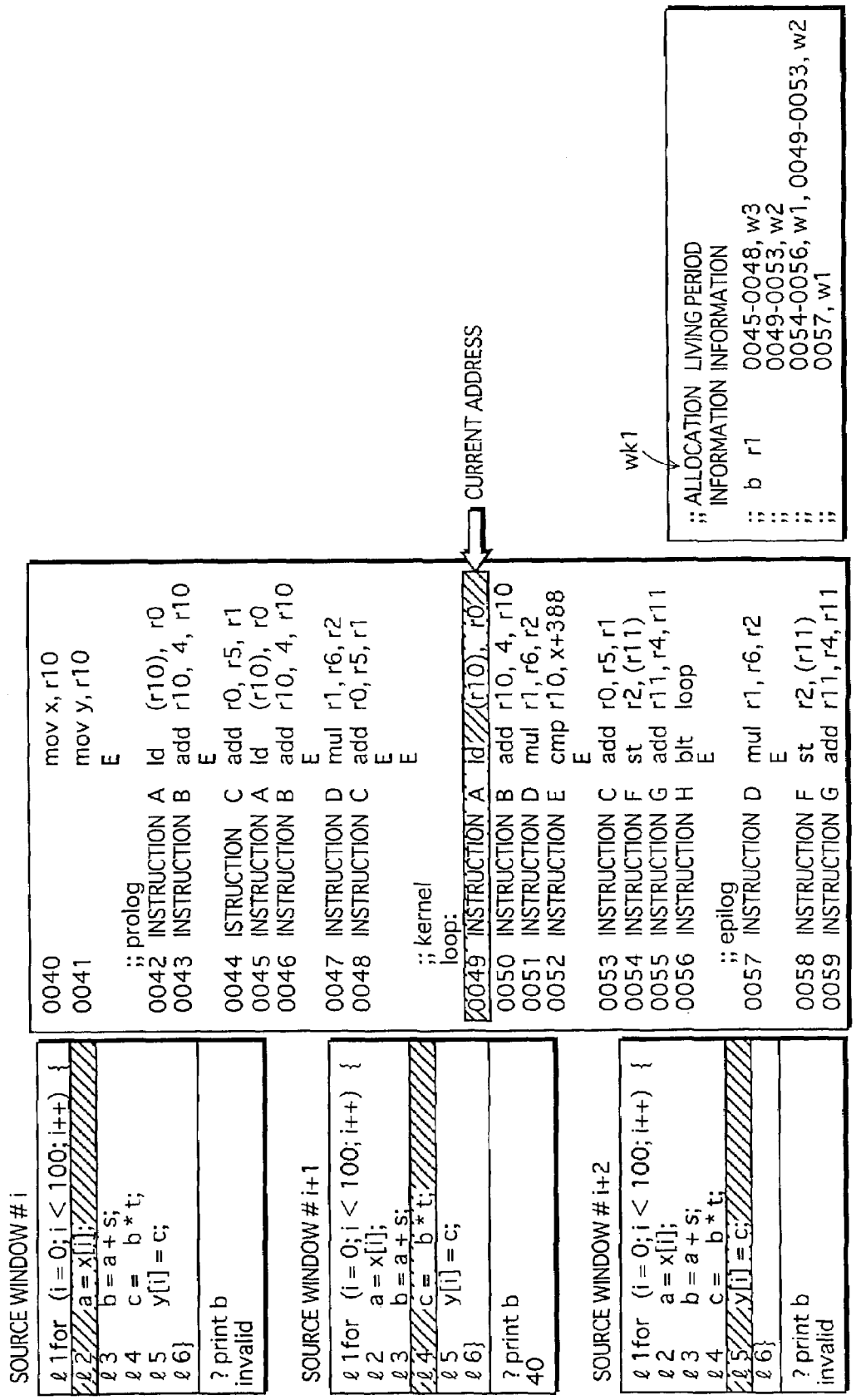
FIG. 27 shows the result of a user's specifying variable b in the source window of FIG. 19.

FIG. 27 shows the result of the user's specifying variable b in the source window in FIG. 19. In FIG. 19, the current address is at 0049, and it is judged whether or not the address 0049 is within the living period of the variable in Step S74. The box wk1 shows an example of allocation information for the program shown in FIG. 19. In this allocation information, address 0049 is within the living period to which window identifier w2 is attached; therefore, the variable b is valid at address 0049, so the value of resource r1 allocated to variable b will be displayed as a value of the variable (Step 77). Furthermore, since line number ";14" is attached to Instruction A "ld (r10), r0" at address 0049, the sentence on line 4 in source window #i+1 is highlighted.

In conclusion, according to this embodiment of the invention, by having as many windows as the number of the stages of the soft ware pipelining for displaying locations of halts and variable values, it is possible for a user to understand the execution status of each iteration without being confused.

The preferred embodiment has been explained so far; however, it has been presented as a mere example of a system which is expected to have the best effect in the current situation. This invention could be modified without diverging from the general idea. The following (A) through (G) are some examples of modifications:

(A) Needless to say, it is acceptable to have the window identifier attaching unit 8 and the allocation information converting unit 9 disposed inside the compiling device, instead of inside the debugging aid device as in the embodiment presented. (B) When execution of the secondary assembler program comes to a halt at a breakpoint, a plurality of source windows are displayed and a sentence that corresponds to an instruction at a breakpoint is highlighted in each of the source windows. This may be modified as in (B-1) or (B-2) as below:

(B-1) It is also possible, when execution of instructions comes to a halt at a breakpoint, to refer to the line numbers corresponding to the window identifiers attached to the instruction at the breakpoint, and highlight and display the sentences that correspond to those line numbers in one source window. FIG. 28 shows an example of displays in this modification, and it can be observed that, in one source window, the sentences are highlighted in the lines that correspond to the window identifiers attached to the instruction at the breakpoint address.

(B-2) It is also possible, when execution of instructions comes to a halt at a breakpoint, to refer to the line numbers corresponding to the window identifiers attached to the instruction at the breakpoint, and highlight and display in one window only one representative sentence selected from the sentences that correspond to those line numbers. The way of selecting a sentence is either (a) to select a line number corresponding to an earliest iteration of those iterations, or (b) to select a line number corresponding to an iteration most behind. More specifically, it may be explained as follows with reference to the example in FIG. 29: If the instruction at the breakpoint address has window identifiers w1, w2, and w3 attached, and line numbers ";12", ";14", and ";15" are attached to these window identifiers, then the line number ";15" corresponds to the earliest iteration, so the sentence in line 5 is highlighted in this case.

(c) In the preferred embodiment, it has been explained with an example in which soft ware pipelining is performed on a primary assembler program; however, this invention is not limited to that example. This invention could be applied to any methods of optimization as long as it involves a process of translating the body of a loop into iteration-forming instructions. One of such methods is Loop Unrolling.

Loop unrolling is a method of optimization to improve efficiency of processing a loop by writing a sentence included in the body of a loop into a plurality of sentences. For example, here is a loop in which the sentences "a[i]=b[i]*(x+10)""i++" are repeated till the variable i gets to 100, where the element in array a is defined by the element in array b. When Loop Unrolling is applied to this loop, the sentences in the loop body "a[i]=b[i]* (x+10)""i++" will be changed into such sentences as "a[i]=b[i]*(x+10)" "a[i+1]=b[i+1]*(x+10)""i+=2". Before this change, the induction variable i is incremented by 1 as shown in "i++", and after the change, the induction variable i is incremented by 2 as shown in "i+=2". Before the change, every time the loop is executed, one element of the array a is determined, and after the change, every time the loop is executed, two elements of the array a are determined by such two sentences as "a[i]=b[i]*(x+10)" and "a[i+1]=b[i+1]*(x+10)". Since these two sentences are translated into two different groups of iteration-forming instructions, a stage identifier will be attached to each of the groups. By doing so, the debugging aid device of the present invention is able to offer the same debugging process to the secondary assembler program processed with Loop Unrolling as in the preferred embodiment.

(D) In the preferred embodiment, the program operating environment 3 and the debugging aid device 6 are presented as two separated structures, but it is acceptable to have them in one structure. It is also possible to have "the user interface 7 through the resource operating unit 13" in the debugging aid device 6 as programs that are executed by the processor 5. It is further possible to have "the user interface 7 through the resource operating unit 13" in the debugging aid device 6 as programs that are executed by another processor besides the processor 5.

(E) In the preferred embodiment, the compiling device and the debugging aid device 6 are presented as two separated devices, but it is acceptable to have them in one structure. It is also possible to have "the compiler core 1 and the soft ware pipelining unit 2" in the compiling device as programs that are executed by the processor 5. Further, it is possible to have the program operating environment 3, the debugging aid device 6, and the compiling device in one structure.

(F) When dynamically assigning an iteration to each of the source windows, #i, #i+1, and#i+2, it is possible to display to which round of iteration each source window corresponds.

(G) It is also acceptable to record the program on recording media or transmit the program via a network for the purposes of distribution or sales, by putting the procedures explained with reference to the flowcharts in FIGS. 3, 11, 16, 18, 20, 23, and 26 into execute-form programs. Examples of recording media are IC cards, optical disks, floppy disks, and so on. Machine language programs recorded on these media can be used when being installed on general-purpose computers. Such general-purpose computers execute the execute-form programs installed so as to implement the functions of the debugging aid device and the compiler presented in the preferred embodiment.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A debugging aid device that provides aid in debugging when a plurality of iterations are executed in parallel, each being made up of a succession of instructions which are obtained by a compiler translating a plurality of source codes, the debugging aid device comprising:
   a source list displaying unit displaying dissolving the plurality of source lists in correspondence with each of the plurality of iterations;
   a specifying unit specifying, according to an input from a user, a source code within a first source list as a starting or an ending location of the execution; and
   a source code displaying unit displaying which source code, within a second source list, corresponds to the specified source code within the first source list.

2. The debugging aid device of claim 1, further comprising
   a detecting unit detecting a first instruction that corresponds to the source code specified by the specifying unit and executing the iteration starting from or ending with the first instruction, wherein
   the source code from the second source list corresponding to the starting or the ending location corresponds to a second instruction that belongs to a different iteration than the first instruction and is to be executed simultaneously with the first instruction.

3. The debugging aid device of claim 2, further comprising:
   a storing unit storing an object program which includes a plurality of parallel execution blocks, each being made up of a group of instructions that are to be executed simultaneously and belong to mutually different iterations, wherein
   the second instruction belongs to the same parallel execution block as the first instruction.

4. The debugging aid device of claim 3, further comprising
   a retaining unit retaining a debug list in which the instructions in the object program each have a combination of an identifier and a line number attached thereto, wherein
   the identifier indicates to which iteration each of the instructions belongs, whereas the line number indicates in which line of a source list, a source code of each of the instructions is located, and
   the detecting unit detects the first instruction by referring to, in the debug list, a combination of (a) the line number of the source code specified by the specifying unit and (b) the identifier for an iteration that corresponds to the first source list.

5. The debugging aid device of claim 4, wherein
   in the debug list, the identifier attached to the second instruction is different from the identifier attached to the first instruction, and
   the code displaying unit displays the source code from the second source list corresponding to the starting or the ending location by referring to the line number attached to the second instruction in the debug list.

6. A compiling device that translates a source program so as to generate the object program and the debug list that are of claim 5, the compiling device comprising:
   a translating unit translating a plurality of source codes that form a loop body in the source program into a succession of instructions;
   a copying unit copying the succession of instructions so as to have a plurality of iterations each being made up of the succession of the instructions;
   a grouping unit operable to group up grouping together such instructions that belong to the successions of the instructions and are to be executed simultaneously into each of a plurality of parallel execution blocks separated by a boundary code; and
   a creating unit creating the debug list by attaching a combination of an identifier and a line number to each of the instructions in the parallel execution blocks, the identifier uniquely identifying one particular iteration among the plurality of iterations, and the line number identifying one of the source codes for the particular iteration.

7. The compiling device of claim 6, wherein
   the plurality of iterations are executed in a pipeline made up of a prolog, a kernel, and an epilog, and
   the compiling device further comprises
   a classifying unit classifying each of the parallel execution blocks into one of the prolog, the kernel, and the epilog.

8. The compiling device of claim 6, wherein
   the identifier attached to each of the instructions in the prolog and the epilog is a number being counted starting with the iteration to be executed earliest, and
   the identifier attached to each of the instructions in the kernel is a number being counted starting with the iteration to be executed latest.

9. The compiling device of claim 6, further comprising
   a generating unit generating, for each of the iterations, a piece of allocation information that indicates a valid range of each of variables, wherein
   each of the instructions belonging to the iterations uses a resource allocated to each of the variables as an operand.

10. The bugging aid device of claim 1, wherein
    the code displaying unit uses different manners for displaying the source code specified from the first source list and the source code from the second source list corresponding to the starting or the ending location.

11. The debugging aid device of claim 1 further comprising
    a variable displaying unit displaying, for each of the source lists, a value of each of variables used in the source lists, wherein,
    the value of each of the variables is determined either at the starting or the ending location of each of the source lists.

12. The debugging aid device of claim 11, wherein
    the variable displaying unit displays the value of each of the variables if the variable is within a valid range in the source list, and the variable displaying unit does not display the value, if not.

13. The debugging aid device of claim 1, wherein
    the ending location is a breakpoint, and
    the breakpoint has a pass count which is based on how many iterations there are between an iteration that includes the starting location and another iteration that includes the ending location.

14. The debugging aid device of claim 1, wherein
when one of the iterations is executed from a particular instruction by one instruction at a time,
the specifying unit specifies a source code of the particular instruction as the starting location, and specifies a next source code of the source code of the particular instruction as the ending location.

15. A debugging aid program stored on a computer-readable medium for debugging computer programs when a plurality of iterations are executed in parallel, each being made up of a succession of instructions which are obtained by a compiling program translating a plurality of source codes, the debugging aid program comprising:
a list displaying step of displaying the plurality of source lists in correspondence with each of the plurality of iterations;
a specifying step of specifying, according to an input from a user, a source code within a first source list as a starting or an ending location of the execution; and
a code displaying step of displaying which source code within a second source list corresponds to the starting or the ending location of the execution.

16. The debugging aid program of claim 15 further including:
a detecting step of detecting a first instruction that corresponds to the source code specified by the specifying step and to execute the iteration starting from or ending with the α instruction, wherein
the source code from the second source list corresponding to the starting or the ending location corresponds to a second instruction that belongs to a different iteration than the first instruction and is to be executed simultaneously with the first instruction.

17. The debugging aid program of claim 16, wherein
the computer comprises
a storing unit operable to store an object program which includes a plurality of parallel execution blocks, each being made up of a group of instructions that are to be executed simultaneously and belong to mutually different iterations, and
the second instruction belongs to the same parallel execution block as the first instruction.

18. The debugging aid program of claim 17, wherein
the computer further comprises
a retaining unit operable to retain a debug list in which the instructions in the object program each have a combination of an identifier and a line number attached thereto, and
the identifier indicates to which iteration each of the instructions belongs, whereas the line number indicates in which line of a source list, a source code of each of the instructions is located, and
the detecting step detects the first instruction by referring to, in the debug list, a combination of (a) the line number of the source code specified by the specifying step and (b) the identifier for an iteration that corresponds to the first source list.

19. The debugging aid program of claim 18, wherein
in the debug list, the identifier attached to the second instruction is different from the identifier attached to the first instruction, and
the code displaying step displays the source code from the second source list corresponding to the starting or the ending location by referring to the line number attached to the second instruction in the debug list.

20. A compiling program stored on a computer-readable medium for translating a source program so as to generate the object program and the debug list of claim 19, the compiling program including:
a translating step of translating a plurality of source codes that form a loop body in the source program into a succession of instructions;
a copying step of copying the succession of instructions so as to have a plurality of iterations each being made up of the succession of the instructions;
a grouping step of grouping up such instructions that belong to the successions of the instructions and are to be executed simultaneously into each of a plurality of parallel execution blocks separated by a boundary code; and
a creating step of creating the debug list by attaching a combination of an identifier and a line number to each of the instructions in the parallel execution blocks, the identifier uniquely identifying one particular iteration among the plurality of iterations, and the line number identifying one of the source codes for the particular iteration.

21. The compiling program of claim 20, wherein
the plurality of iterations are executed in a pipeline made up of a prolog, a kernel, and an epilog, and
the compiling device further includes
a classifying step of classifying each of the parallel execution blocks into one of the prolog, the kernel, and the epilog.

22. The compiling program of claim 20, wherein
the identifier attached to each of the instructions in the prolog and the epilog is a number being counted starting with the iteration to be executed earliest, and
the identifier attached to each of the instructions in the kernel is a number being counted starting with the iteration to be executed latest.

23. The compiling program of claim 20, further including
a generating step of generating, for each of the iterations, a piece of allocation information that indicates a valid range of each of variables, wherein
each of the instructions belonging to the iterations uses a resource allocated to each of the variables as an operand.

24. The debugging aid program of claim 15, wherein
the code displaying step uses different manners for displaying the source code specified from the first source list and the source code from the second source list corresponding to the starting or the ending location.

25. The debugging aid program of claim 15, further including
a variable displaying step of displaying, for each of the source lists, a value of each of variables used in the source lists, wherein,
the value of each of the variables is determined either at the starting or the ending location of each of the source lists.

26. The debugging aid program of claim 25, wherein
the variable displaying step displays the value of each of the variables if the variable is within a valid range in the source list, and the variable displaying step does not display the value, if not.

27. The debugging aid program of claim 15, wherein
the ending location is a breakpoint, and
the breakpoint has a pass count which is based on how many iterations there are between an iteration that includes the starting location and another iteration that includes the ending location.

28. The debugging aid program of claim 15, wherein when one of the iterations is executed from a particular instruction by one instruction at a time,
the specifying step specifies a source code of the particular instruction as the starting location, and specifies a next source code of the source code of the particular instruction as the ending location.

29. A debugging aid device that provides aid in debugging when a plurality of iterations are executed in parallel, each being made up of succession of instructions, the debugging aid device comprising:
a list displaying unit displaying a plurality of source lists to a user, each source list comprising a plurality of source code lines, and identifying which source code line is on execution within each of the plurality of source lists in correspondence with each of the plurality of iterations being executed in parallel to enable a verification and/or correction of the source lists.

30. A debugging aid device that provides aid in debugging when a plurality of iterations are executed in parallel, each being made up of succession of instructions, the debugging aid device comprising:
a list displaying unit displaying a source list to a user, the source list comprising a plurality of source code lines, and identifying which source code lines are on execution within the source list in correspondence with each of the plurality of iterations being executed in parallel to enable a verification and/or correction of the, source lists.

* * * * *